(12) United States Patent
Khoshnevisan et al.

(10) Patent No.: US 12,395,999 B2
(45) Date of Patent: Aug. 19, 2025

(54) COMMON MESSAGE SPLIT INDICATORS FOR RATE- SPLITTING MIMO

(71) Applicant: QUALCOMM Incorporated, San Diego, CA (US)

(72) Inventors: Mostafa Khoshnevisan, San Diego, CA (US); Jing Sun, San Diego, CA (US); Ahmed Abdelaziz Ibrahim Abdelaziz Zewail, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 618 days.

(21) Appl. No.: 17/809,264

(22) Filed: Jun. 27, 2022

(65) Prior Publication Data

US 2023/0422254 A1    Dec. 28, 2023

(51) Int. Cl.
*H04W 72/23*       (2023.01)
*H04B 7/06*        (2006.01)
*H04L 1/00*        (2006.01)
*H04W 72/1263*     (2023.01)

(52) U.S. Cl.
CPC .......... *H04W 72/23* (2023.01); *H04B 7/0639* (2013.01); *H04L 1/0047* (2013.01); *H04L 1/0061* (2013.01); *H04W 72/1263* (2013.01)

(58) Field of Classification Search
CPC ............................. H04W 76/25; H04W 72/23
See application file for complete search history.

(56) References Cited

U.S. PATENT DOCUMENTS

| | | | |
|---|---|---|---|
| 2013/0039297 A1* | 2/2013 | Wang .................... | H04W 76/25 370/328 |
| 2017/0006591 A1* | 1/2017 | Pani ....................... | H04W 72/23 |
| 2017/0280449 A1* | 9/2017 | Johansson ......... | H04W 72/0446 |
| 2018/0270807 A1* | 9/2018 | Salem ............... | H04W 72/0446 |
| 2022/0400475 A1* | 12/2022 | Suh ........................ | H04W 72/23 |

FOREIGN PATENT DOCUMENTS

KR         20100010498 A   *  2/2010    ........ H04W 72/1273

* cited by examiner

*Primary Examiner* — Charles N Appiah
*Assistant Examiner* — Frank E Donado
(74) *Attorney, Agent, or Firm* — Procopio, Cory, Hargreaves & Savitch LLP

(57) ABSTRACT

A first UE may be configured to receive a common message associated with the first UE and at least one second UE. The first UE may be configured to obtain a common message configuration having at least one of a first indicator for a first data portion of the common message associated with the first UE or at least one second indicator for at least one second data portion of the common message associated with the at least one second UE. The common message configuration may be obtained from at least one of a header of the common message or DCI scheduling the common message.

23 Claims, 17 Drawing Sheets

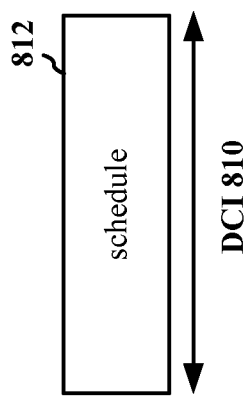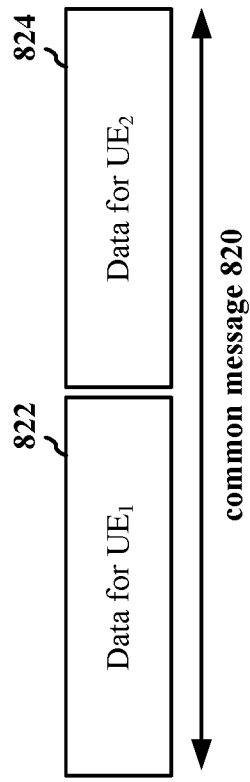
FIG. 8A
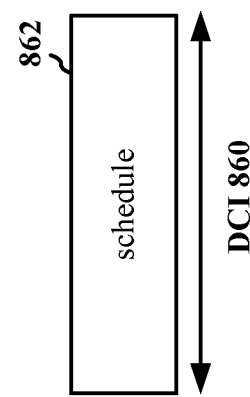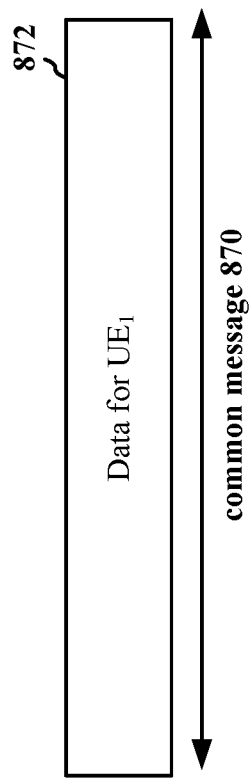
FIG. 8B

COMMON MESSAGE SPLIT INDICATORS FOR RATE-SPLITTING MIMO

TECHNICAL FIELD The present disclosure relates generally to communication systems, and more particularly, to a rate-splitting multiple input-multiple output (MIMO) communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may have a memory and at least one processor coupled to the memory at a first UE. Based at least in part on information stored in the memory, the at least one processor may be configured to receive a common message associated with the first UE and at least one second UE. Based at least in part on information stored in the memory, the at least one processor may be configured to obtain a common message configuration having at least one of a first indicator for a first data portion of the common message associated with the first UE or at least one second indicator for at least one second data portion of the common message associated with the at least one second UE. The common message configuration may be obtained from at least one of a header of the common message or DCI scheduling the common message.

In an aspect of the disclosure, a method, a computer-readable medium, and an apparatus are provided. The apparatus may have a memory and at least one processor coupled to the memory at a network entity. Based at least in part on information stored in the memory, the at least one processor may be configured to configure a common message configuration having at least one of a first indicator for a first data portion of a common message associated with a first UE or at least one second indicator for at least one second data portion of the common message associated with at least one second UE. Based at least in part on information stored in the memory, the at least one processor may be configured to transmit at least one of (a) the common message having the common message configuration or (b) the common message and the common message configuration to the first UE and at least one second UE.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8A is a diagram illustrating an example of DCI and a common message format for a multi-user rate-splitting MIMO system.

FIG. 8B is a diagram illustrating another example of DCI and a common message format for a multi-user rate-splitting MIMO system.

DETAILED DESCRIPTION

Figure 1:
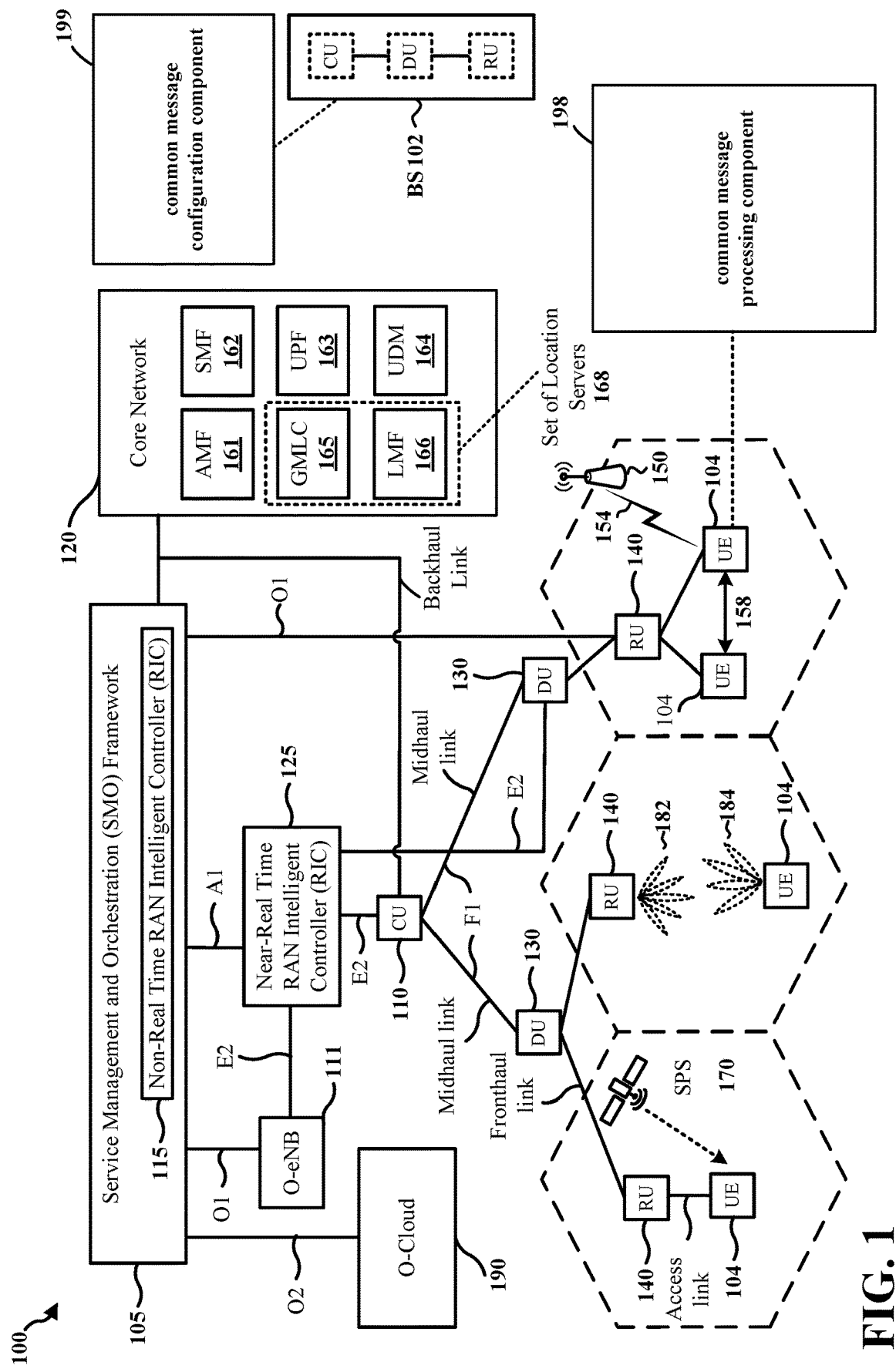
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a common message processing component 198 configured to receive a common message associated with the first UE and at least one second UE. The common message processing component 198 may be configured to obtain a common message configuration having at least one of a first indicator for a first data portion of the common message associated with the first UE or at least one second indicator for at least one second data portion of the common message associated with the at least one second UE. The common message configuration may be obtained from at least one of a header of the common message or DCI scheduling the common message. In certain aspects, the base station 102 may have a common message configuration component 199 configured to configure a common message configuration having at least one of a first indicator for a first data portion of a common message associated with a first UE or at least one second indicator for at least one second data portion of the common message associated with at least one second UE. The common message configuration component 199 may be configured to transmit at least one of (a) the common message having the common message configuration or (b) the common message and the common message configuration to the first UE and at least one second UE. Although the following description may be focused on multi-user rate-splitting MIMO transmissions, the concepts described herein may be applicable to other similar areas, such as any transmissions having private and common elements. Although the following description may be focused on 5G NR, the concepts described herein may be applicable to other similar areas, such as LTE, LTE-A, CDMA, GSM, and other wireless technologies.

Figure 2:
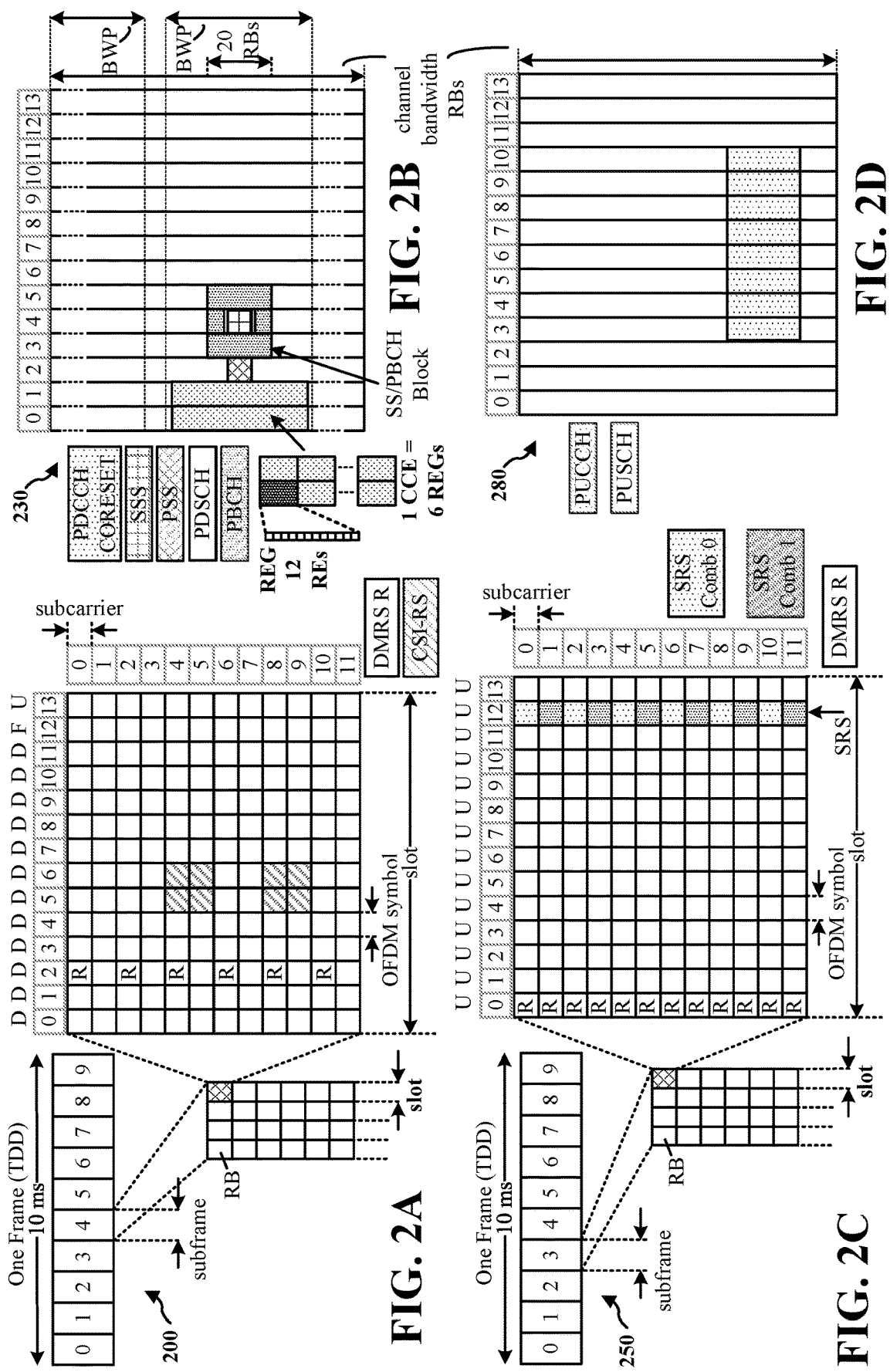
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu \ast$ 15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
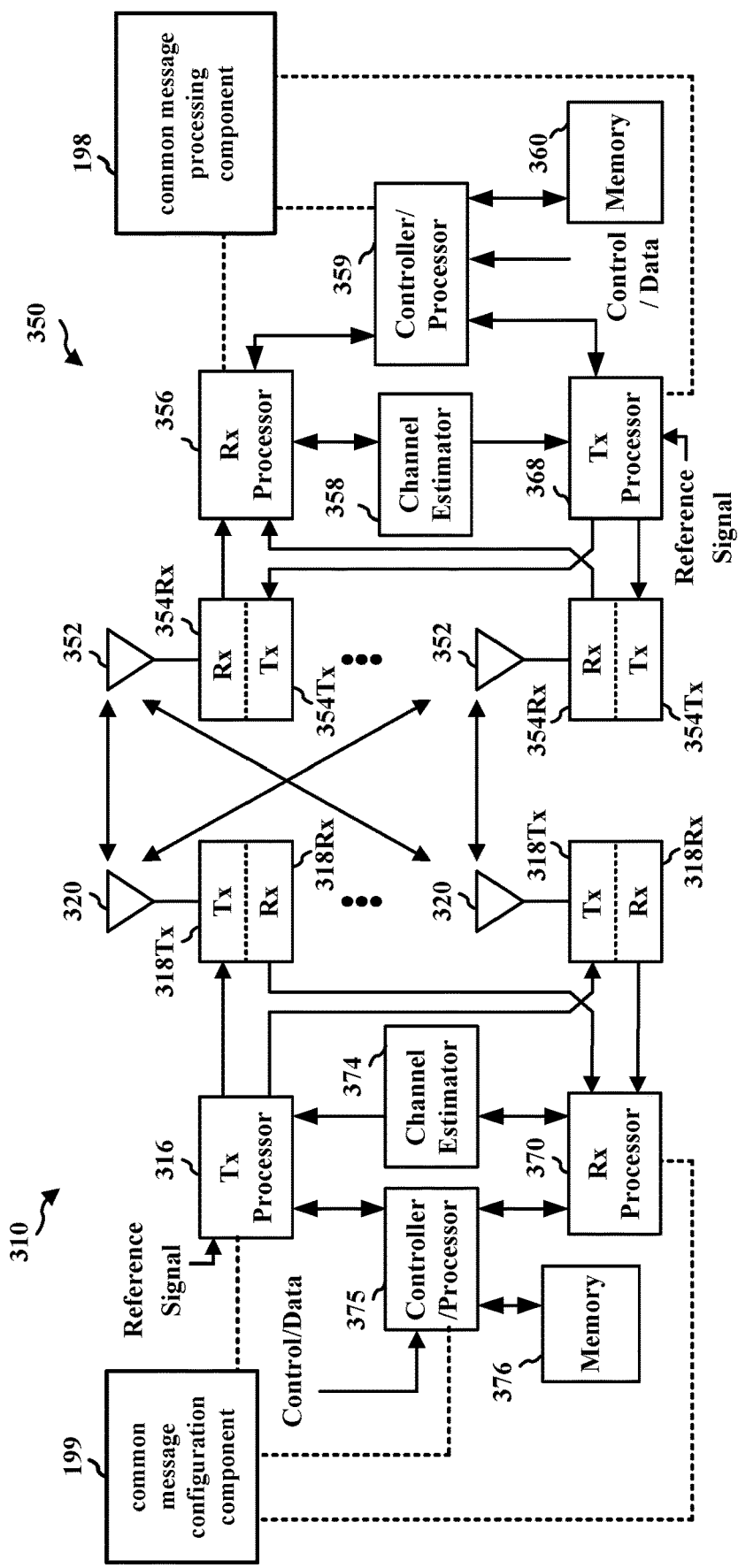
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the common message processing component 198 of FIG. 1.

At least one of the Tx processor 316, the Rx processor 370, and the controller/processor 375 may be configured to perform aspects in connection with the common message configuration component 199 of FIG. 1.

Figure 4:
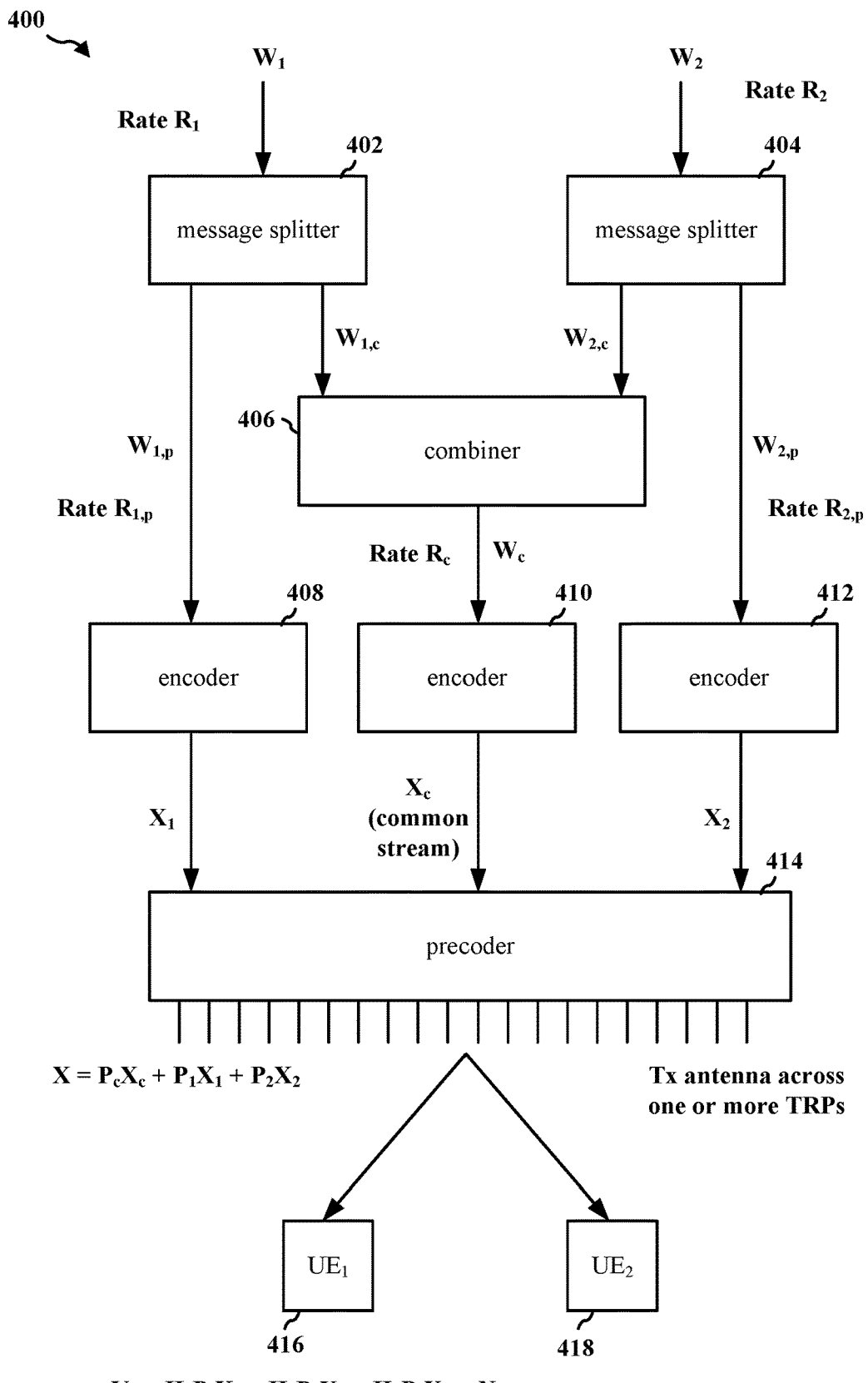
FIG. 4 is a diagram illustrating an example of a multi-user rate-splitting MIMO system at a transmitting network entity.

FIG. 4 is a diagram 400 illustrating an example of a multi-user rate-splitting MIMO system at a transmitting network entity, such as the base station 102 in FIG. 1. A rate-splitting system for broadcast channels may be able to achieve a larger degree of freedom and/or capacity than a non-rate splitting system. A network entity may have a message $W_1$ for a $UE_1$ 416 and a message $W_2$ for a $UE_2$ 418. Each message may be divided into a private portion and a public/common portion. The message splitter 402 may split the message $W_1$ for the $UE_1$ 416 into a private portion $W_{1,p}$ and a common portion $W_{1,c}$. Similarly, the message splitter 404 may split the message $W_2$ for the $UE_2$ 418 into a private portion $W_{2,p}$ and a common portion $W_{2,c}$. The combiner 406 may combine the common portion $W_{1,c}$ and the common portion $W_{2,c}$ into a common message $W_c$. The combiner 406 may concatenate the common portion $W_{1,c}$ and the common portion $W_{2,c}$ to generate the common message $W_c$. The encoder 410 may encode the common message $W_c$ to generate the encoded common portion $X_c$, which also may be referred to as a common stream. The common stream may have one or more layers. The encoder 410 may modulate the common message $W_c$. The encoder 410 may map the data of the common message $W_c$ to one or more layers, for example by using a code word layer mapping system, in addition to encoding the common message $W_c$. The precoder 414 may precode the encoded common portion $X_c$ by $P_c$, and may transmit the portion $P_cX_c$ by one or more transmitting antennas (e.g., from one or more transmission and reception points (TRPs) or a base station such as BS 102 in FIG. 1).

The encoder 408 may encode the private portion $W_{1,p}$ to generate the encoded private portion $X_1$ for the $UE_1$ 416, which also may be referred to as a private stream for the $UE_1$ 416. The private stream may have one or more layers. The encoder 408 may modulate the private portion $W_{1,p}$. The encoder 408 may map the data to one or more layers in addition to encoding the private portion $W_{1,p}$. The precoder 414 may precode the encoded private portion $X_1$ by $P_1$, and may transmit the portion $P_1X_1$ by one or more transmitting antennas/TRPs/BSs. The encoder 412 may encode the private portion $W_{2,p}$ to generate the encoded private portion $X_2$ for the $UE_2$ 418, which also may be referred to as a private stream for the $UE_2$ 418. The private stream may have one or more layers. The encoder 412 may also modulate the private portion $W_{2,p}$ and map the data to one or more layers, for example by using a CW-layer mapping system, in addition to encoding the private portion $W_{2,p}$. The precoder 414 may precode the encoded private portion $X_2$ by $P_2$, and may transmit the portion $P_2X_2$ by one or more transmitting antennas/TRPs/BSs.

The signal output by the precoder 414 may be represented by $X=P_cX_c+P_1X_1+P_2X_2$, where $X_1$ may represent a private portion of the message associated with the $UE_1$ 416, $P_1$ may represent the precoder for $X_1$, $X_2$ may represent a private portion of the message associated with the $UE_2$ 418, $P_2$ may represent the precoder for $X_2$, $X_c$ may represent a common portion of the message associated with both the $UE_1$ 416 and the $UE_2$ 418, and $P_c$ may represent the precoder for $X_c$. The transmitted signal X may be transmitted to the $UE_1$ 416 using the $H_1$ channel for the $UE_1$ 416. The signal received by the $UE_1$ 416 may be represented by $Y_1=H_1P_cX_c+H_1P_1X_1+H_1P_2X_2+N_1$, where $H_1P_cX_c$ may represent a private portion of the message associated with the $UE_1$ 416 received via the $H_1$ channel for the $UE_1$ 416, $H_1P_2H_2$ may represent a private portion of the message associated with the $UE_2$ 418 received via the $H_1$ channel for the $UE_1$ 416, $H_2P_cX_c$ may represent a common portion of the message associated with both the $UE_1$ 416 and the $UE_2$ 418 received via the $H_1$ channel for the $UE_1$ 416, and $N_1$ may represent the noise of the signal $Y_1$. Similarly, the transmitted signal X may be transmitted to the $UE_2$ 418 using the $H_2$ channel for the $UE_2$ 418. The signal received by the $UE_2$ 418 may be represented by $Y_2=H_2P_cX_c+H_2P_1X_1+H_2P_2X_2+N_2$, where $H_2P_cX_c$ may represent a private portion of the message associated with the $UE_1$ 416 received via the $H_2$ channel for the $UE_2$ 418, $H_2P_2X_2$ may represent a private portion of the message associated with the $UE_2$ 418 received via the $H_2$ channel for the $UE_2$ 418, $H_2P_cX_c$ may represent a common portion of the message associated with both the $UE_1$ 416 and the $UE_2$ 418 received via the $H_2$ channel for the $UE_2$ 418, and $N_2$ may represent the noise of the signal $Y_2$.

Figure 5:
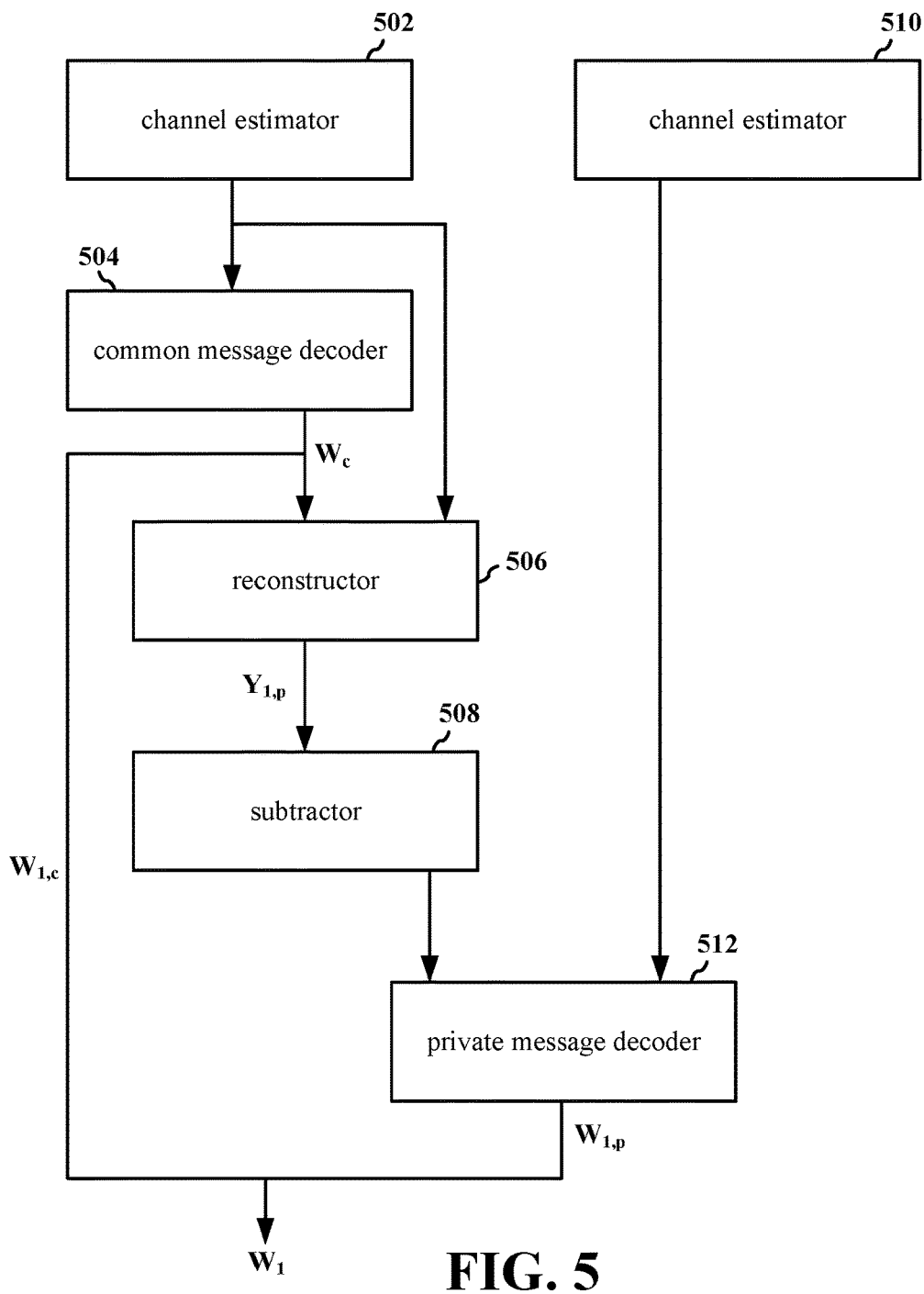
FIG. 5 is a diagram illustrating an example of a multi-user rate-splitting MIMO system at a receiving UE.

FIG. 5 is a diagram 500 illustrating an example of a multi-user rate-splitting MIMO system at a receiving UE, such as the UE 104 in FIG. 1 or the $UE_1$ 416 in FIG. 4. The $UE_1$ 416 in FIG. 4 may receive the signal $Y_1=H_1P_cX_c+H_1P_1X_1+H_1P_2X_2+N_1$, and may decode the common portion $H_1P_cX_c$ and the private portion $H_1P_1X_1$ to reconstruct the message for the $UE_1$-$W_1$. At the receiver side, the $UE_1$ 416 may first decode the common message using the common message decoder 504 for two purposes. The first purpose may be to retrieve the common portion $W_{1,c}$, since a part of the individual message for each UE (e.g., $W_{1,c}$ for the $UE_1$ 416 and $W_{2,c}$ for the $UE_2$ 418) may be embedded in the common message $W_c$. The second purpose may be to perform successive interference cancellation on the signal $Y_1$ to decode the private portion $W_{1,p}$.

The channel estimator 502 may estimate the effective channel $H_1P_c$ corresponding with the received common stream $H_1P_cX_c$. The common message decoder 504 may use the channel estimate (CE) for the received common stream to decode the common message $W_c$, which may be a concatenation of the common portion $W_{1,c}$ and the common portion $W_{2,c}$. The common message decoder 504 may also perform demodulation and demapping on the common stream $H_1P_cX_c$ of the signal $Y_1$ in addition to decoding. The reconstructor 506 may reconstruct the received common stream $H_1P_cX_c$ from the common message $W_c$ by re-encoding the common message $W_c$ to generate an estimate of the common stream $X_c$, and multiply the estimate of the effective channel $H_1P_c$ with the estimate of the common stream $X_c$ to obtain an estimate of the received common stream $H_1P_cX_c$. The subtractor 508 may subtract the estimate of the received common stream $H_1P_cX_c$ from the signal $Y_1$ to perform interference cancellation on the signal $Y_1$. Assuming perfect channel estimation by the channel estimator 502 and successful decoding by the common message decoder 504, the subtractor may be able to clean up the signal $Y_1=H_1P_cX_c+H_1P_1X_1+H_1P_2X_2+N_1$ by subtracting the estimate of the received common stream $H_1P_cX_c$ to obtain an estimate of $Y_{1,p}=Y_1-H_1P_cX_c=H_1P_1X_1+H_1P_2X_2+N_1$.

The channel estimator 510 may estimate the effective channel $H_1P_1$ corresponding with the received private stream $H_1P_1X_1$. The private message decoder 512 may use the estimate of the effective channel $H_1P_1$ and the estimate of $Y_{1,p}$ to decode the private portion $W_{1,p}$. The private message decoder 512 may also perform demodulation and demapping on the private stream $H_1P_1X_1$ of the signal $Y_1$ in addition to decoding. The common portion $W_{1,c}$ and the private portion $W_{1,p}$ may be concatenated to obtain the message $W_1$ for the $UE_1$ 416. In some aspects, the $UE_1$ 416 may be configured to jointly decode the private stream and the public stream without performing interference cancellation to decode the private portion $W_{1,p}$ of the message $W_1$ for the $UE_1$ 416.

While FIG. 4 shows an example of a multi-user rate-splitting MIMO system splitting two messages, message $W_1$ for a $UE_1$ 416 and a message $W_2$ for a $UE_2$, more or less messages may be combined into a common stream in other aspects. In some aspects, the message splitter 402 in FIG. 4 may not split any of the message $W_1$ for the $UE_1$ 416 into a common portion $W_{1,c}$. In such aspects, the precoder 414 may output a signal $X=P_cX_c+P_1X_1+P_2X_2$, where $P_1X_1$ may represent a private portion of the message associated with the $UE_1$ 416, $P_2X_2$ may represent a private portion of the message associated with the $UE_2$ 418, and $P_cX_c$ may represent a common portion of the message associated with both the $UE_1$ 416 and the $UE_2$ 418 which does not contain any portion of the message $W_1$. The $UE_1$ 416 in FIG. 5 may decode the common message $H_1P_cX_c$ for the purpose of successive interference cancellation (SIC) and decoding the private message $H_1P_1X_1$. In such aspects, the $UE_1$ 416 may decode the common message $H_1P_cX_c$ at a PHY layer, and may not pass on the common message, decoded or otherwise, to the higher layers.

Similarly, in some aspects, the message splitter 404 in FIG. 4 may not split any of the message $W_2$ for the $UE_2$ 418 into a common portion $W_{2,c}$. In such aspects, the precoder 414 may output a signal $X=P_cX_c+P_1X_1+P_2X_2$, where $P_1X_1$ may represent a private portion of the message associated with the $UE_1$ 416, $P_2X_2$ may represent a private portion of the message associated with the $UE_2$ 418, and $P_cX_c$ may represent a common portion of the message associated with both the $UE_1$ 416 and the $UE_2$ 418 which does not contain any portion of the message $W_2$. The $UE_2$ 418 may decode the common message $H_1P_cX_c$ for the purpose of successive interference cancellation (SIC) and decoding the private message $H_1P_1X_1$. In such aspects, the $UE_1$ 416 may decode the common message $H_1P_cX_c$ at a PHY layer, and may not pass on the common message, decoded or otherwise, to the higher layers.

Similarly, messages for three or more UEs may be split and combined into a common stream. A subset of a set of UEs may have messages split and combined into a common stream. For example, a network entity may be configured to transmit four private messages and a common message for four UEs, a first UE, a second UE, a third UE, and a fourth UE, and the common message may combine portions of the message for the first UE, the second UE, and the third UE, but not the fourth UE. The fourth UE may decode the common message at the PHY layer for the purpose of SIC and decoding the private message for the fourth UE, but the common message may not be used by the layers higher than the PHY layer. In other words, referring to FIG. 5, the private message decoder 512 may be implemented on the PHY layer of a UE, and the output $W_1$ may be output to a higher layer.

The communication rate region may be characterized as a function of a rate of common message(s) and private messages irrespective of how a common message may be distributed among UEs. How a common message may be split between two or more UEs may impact the rate region of the UEs, and may not impact the sum rate across the UEs. In one aspect, in FIG. 4, the achievable rate regions may be characterized as $(R_c, R_{p,1}, R_{p,2})$ irrespective of which part of $R_c$ may be for the $UE_1$ 416 or the $UE_2$ 418. Such a split may impact the rate region $(R_1, R_2)$. Such a split may not impact the achievable sum rate $R_1+R_2$.

In rate-splitting MIMO, a network entity may provide a UE with one or more indications of which part of the common message may contain data for the UE. (e.g., one half, one third, or no part of the common message). The portion of the common message for the UE may be referred to as the UE's data portion of the common message, and may include part of the individual message for the UE. For example, in FIG. 4, the data portion for the $UE_1$ 416 may be $W_{1,c}$, which may include part of the individual message $W_1$ for the $UE_1$ 416. Similarly, the data portion for the $UE_2$ 418 may be $W_{2,c}$, which may include part of the individual message $W_2$ for the $UE_2$ 418. In an aspect with two co-scheduled UEs, the common message may include parts of individual messages for the two UEs (e.g., $W_c=(W_{1,c}, W_{2,c})$). In another aspect with more than two co-scheduled UEs, a UE may receive two separately encoded common messages, where the first common message may include parts of individual messages for three UEs of a set of three UEs (e.g., $W_c^1=(W_{1,c}^1, W_{2,c}^1, W_{3,c}^1)$), and the second common message may include parts of individual messages for two UEs of the set of three UEs (e.g., $W_c^2=(W_{1,c}^2, W_{3,c}^2)$). After the UE decodes the common message, the UE may use information from the network entity to understand which part of the decoded common message includes information for the UE. The UE may pass the portion of the decoded common message that includes information for the UE to one or more higher layers for message assembly.

Figure 6A:
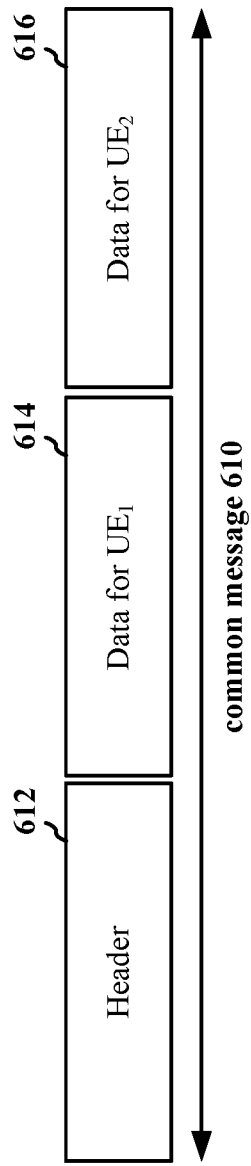
FIG. 6A is a diagram illustrating an example of a common message format for a multi-user rate-splitting MIMO system.

FIG. 6A is a diagram 600 illustrating an example of a common message format for a multi-user rate-splitting MIMO system. The common message 610 may have an indication of which part of the common message includes data for a given UE. The common message 610 may have a header 612, a data portion 614 having data for a first UE, and a data portion 616 having data for a second UE. The header 612 may be, for example, a MAC header. A network entity may add one or more such headers to the common message 610 for such an indication. The header 612 may indicate information, such as a UE identifier (ID) that has data in the common message 610, the order of the data in the common message for UEs that have data portions in the common message 610 (e.g., data for the first UE followed by data for the second UE), or a size of each packet with data for each UE (i.e., the size of data portion 614 for the first UE and the size of data portion 616 for the second UE). In some aspects, the packet size for each data portion may be the same when the common message 610 includes data portions for a plurality of UEs. In one aspect, the packet size for each of the data portions may be indicated in the header 612. In another aspect, the packet size may be derived by the UE after excluding sub-headers by knowing the number of UEs (e.g., (size of common message 610–size of header 612)/number of UEs) The header 612 may indicate one of the set of UEs who have a data portion in the common message 610. Information indicated in the header 612 may be referred to as common message configuration information. In one aspect, the UE ID may be a cell radio network temporary identifier (C-RNTI). In another aspect, the UE ID may indicate an index associated with a UE within a set of UEs configured to attempt decoding the common message 610. The index may refer to a position in a table of UE IDs for UEs scheduled to attempt decoding the common message 610. An index may be used to reduce overhead for indicating a UE ID. In one aspect, when a set of eight UEs are scheduled to attempt decoding of the common message 610, the UE ID may be three bits to identify which UE has a data portion in the common message 610. A PHY layer may decode and pass a decoded common TB or message to the higher layers, such as a MAC layer or an RLC layer. A higher layer may extract the relevant data for the UE once the PHY layer decodes and passes the common TB or message to the higher layer. The PHY layer may not be aware of how the common message may be split across a plurality of UEs and which part of the common message is addressed to the UE.

An index in the header 612 may reference a table that maps to one or more possibilities for the common message 610 may be split across a plurality of UEs. The different possibilities and corresponding indices may be pre-defined or RRC configured to the UE. In one aspect, a first UE, a second UE, and a third UE may decode the common message 610, and the header 612 may include three bits indicating one of the following eight possibilities in Table 1. Table 1 is an example of message split configurations for a number of UEs that may have data portions encoded in the common message 610.

TABLE 1

| Index | Common message split |
| --- | --- |
| 0 | Includes data for $UE_1$ |
| 1 | Includes data for $UE_2$ |
| 2 | Includes data for $UE_3$ |
| 3 | Includes data for $UE_1$ and $UE_2$ with equal split |
| 4 | Includes data for UE1 and $UE_3$ with equal split |
| 5 | Includes data for $UE_2$ and $UE_3$ with equal split |
| 6 | Includes data for $UE_2$ and $UE_3$ with 20/80% split |
| 7 | Includes data for $UE_2$ and $UE_3$ with 80/20% split |

Figure 6B:
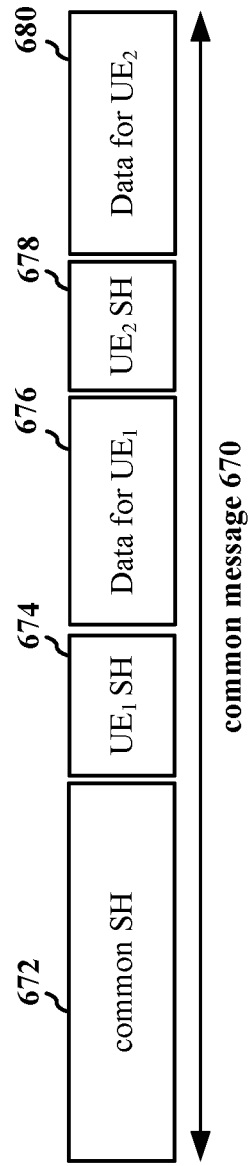
FIG. 6B is a diagram illustrating another example of a common message format for a multi-user rate-splitting MIMO system.

FIG. 6B is a diagram 650 illustrating another example of a common message format for a multi-user rate-splitting MIMO system. The common message 670 may have plurality of indications of which part of the common message includes data for a given UE. A plurality of sub-headers may be used to indicate information for a data portion, such as a UE ID and a packet size. Each of the sub-headers corresponding to each UE may be placed before the data portion for the same UE in the common message 670. The common message 670 may have a common header 672, a sub-header 674 for a first UE, a data portion 676 having data for the first UE, a sub-header 678 for a second UE, and a data portion 680 having data for the second UE. The common header 672, sub-header 674 for the first UE, and sub-header 678 for the second UE, may each be a MAC header. In an aspect where the number of UEs for the common message 670 may be variable, the common header 672 may indicate the number of UEs for which the common message includes data portions. The common header 672 may indicate an index to a table of message split configurations, such as Table 1. A network entity may add one or more such headers or sub-headers to the common message 670 for such an indication. In some aspects, the packet size for each data portion may be the same when the common message 670 includes data portions for a plurality of UEs. In one aspect, the packet size for each of the data portions may be indicated in the common header 672. In another aspect, the packet size may be derived by the UE after excluding sub-headers by knowing the number of UEs (e.g., (size of common message 670–sub-header sizes)/number of UEs) The common header 672, the sub-header 674, or the sub-header 678 may indicate one of the set of UEs who have a data portion in the common message 670. Information indicated in the common header 672, the sub-header 674, or the sub-header 678 may be referred to as common message configuration information. In one aspect, the UE ID may be a C-RNTI. In another aspect, the UE ID may indicate an index associated with a UE within a set of UEs configured to attempt decoding the common message 670. The index may refer to a position in a table of UE IDs for UEs scheduled to attempt decoding the common message 670. An index may be used to reduce overhead for indicating a UE ID. A PHY layer may decode and pass a decoded common TB or message to the higher layers, such as a MAC layer or an RLC layer. A higher layer may extract the relevant data for the UE once the PHY layer decodes and passes the common TB or message to the higher layer. The PHY layer may not be aware of how the common message may be split across a plurality of UEs and which part of the common message is addressed to the UE.

Figure 7A:
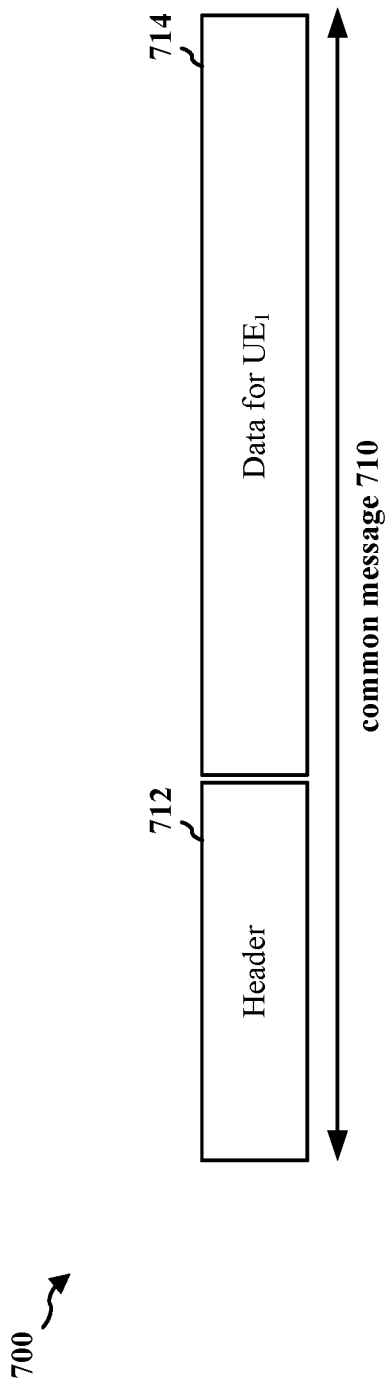
FIG. 7A is a diagram illustrating another example of a common message format for a multi-user rate-splitting MIMO system.

FIG. 7A is a diagram 700 illustrating another example of a common message format for a multi-user rate-splitting MIMO system. The common message 710 may have one or more indications of which part of the common message includes data for a given UE. The common message 710 may include data for one UE. Other UEs may still decode the common message 710 for the purpose of SIC and decoding the private message for the other UEs. The header 712 may indicate a single UE ID. The header 712 may not indicate a number of UEs for which the common message includes data portions. The header may have one data portion 714, having data for the first UE. Encoding a common message 710 having a data portion for one UE may not impact the overall sum rate (e.g., $(R_1+R_2)$) in rate splitting MIMO, but may impact the rate region (e.g., $(R_1, R_2)$) The indicated information in the header 712 may be referred to as common message configuration information. In one aspect, the UE ID may be a C-RNTI. In another aspect, the UE ID may indicate an index associated with a UE within a set of UEs configured to attempt decoding the common message 710. The index may refer to a position in a table of UE IDs for UEs scheduled to attempt decoding the common message 710. An index may be used to reduce overhead for indicating a UE ID. A PHY layer may decode and pass a decoded common TB or message to the higher layers, such as a MAC layer or an RLC layer. A higher layer may extract the relevant data for the UE once the PHY layer decodes and passes the common TB or message to the higher layer. The PHY layer may not be aware of how the common message may be split across a plurality of UEs and which part of the common message is addressed to the UE.

Figure 7B:
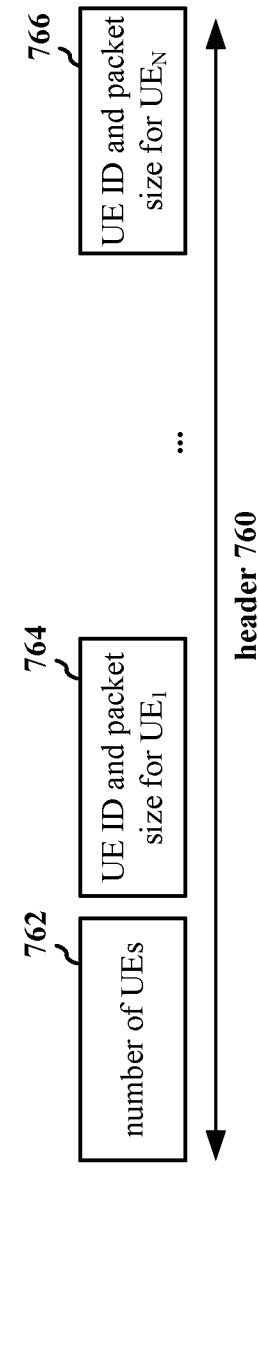
FIG. 7B is a diagram illustrating an example of a header format for a common message of a multi-user rate-splitting MIMO system.

FIG. 7B is a diagram 750 illustrating an example of a header format for a common message of a multi-user rate-splitting MIMO system. A common message, such as the common message 610 in FIG. 6A, may have an indication of which part of the common message includes data for a given UE. The common message may have a header 760 having a plurality of sub-headers. The header 760 may have a first sub-header 762, a second sub-header 764, and a third sub-header 766. The first sub-header 762 may indicate a number of UEs that the common message includes data packets for. The remaining sub-headers of the header 760 may each indicate a UE ID and packet length for each of the number of UEs that the common message includes data packets for. For example, the second sub-header 764 may have a UE ID and a packet size (i.e., packet length) for a first UE of a set of N UEs. The third sub-header 766 may have a UE ID and a packet size for an Nth UE of a set of N UEs. A plurality of sub-headers may be located between the second sub-header 764 and the third sub-header 766 numbering N-2. The header 760 may be a MAC header. Each of the first sub-header 762, the second sub-header 764, and the third sub-header 766 may be, a MAC header. A network entity may add one or more such headers or sub-headers to a common message, such as the common message 610, for such an indication. The information in the header 760 may be referred to as common message configuration information. In one aspect, the UE ID may be a C-RNTI. In another aspect, the UE ID may indicate an index associated with a UE within a set of UEs configured to attempt decoding a common message associated with the header 760. The index may refer to a position in a table of UE IDs for UEs scheduled to attempt decoding the common message. An index may be used to reduce overhead for indicating a UE ID.

FIG. 8A is a diagram 800 illustrating an example of DCI and a common message format for a multi-user rate-splitting MIMO system. A DCI 810 may have configuration information 812 that schedules a common message 820. The common message 820 may have data portions for one or more UEs, such as the data portion 822 for a first UE and a data portion 824 for a second UE. The configuration information 812 may have an indication of which part of the common message 820 includes data for a given UE. The PHY layer of the UE may use the configuration information 812 to understand how the common message 820 is split across a set of UEs. The PHY layer of the UE may use the configuration information 812 to understand which part of the common message 820 is addressed to the UE. The PHY layer of the UE may decode the common message 820, identify the data portion of the common message 820 for the UE (e.g., data portion 822 for the first UE), and deliver the decoded data relevant to the UE to one or more layers higher than the PHY layer, such as a MAC layer or an RLC layer. The configuration information 812 may schedule the private message for the UE as well as the common message 820.

A Unicast DCI (not common to more than one UE) may schedule the private message for the UE. The DCI 810 have one or more fields that have common message configuration information, such as a field that indicates whether the common message includes the first data portion of the common message associated with the first UE a field that indicates at least one of a first UE ID for the first UE or at least one second UE ID for the at least one second UE, a field that indicates a total number of UEs scheduled to attempt decoding the common message 820, a field that indicates an index to a table of UE IDs for UEs scheduled to attempt decoding the common message 820, or an index to a table of split configurations. A DCI field that has common message configuration information may be RRC configured to the UE per DCI format. For example, an RRC configuration may have a first DCI format that includes a first field of DCI that indicates whether the common message includes the first data portion of the common message associated with the first UE, a second DCI format that includes a second field of the DCI that indicates at least one of a first UE ID for the first UE or at least one second UE ID for the at least one second UE, or a third DCI format that schedules a non-rate splitting transmission. A DCI format that schedules a non-rate splitting transmission may be used for regular DL scheduling and may not be used for rate splitting.

FIG. 8B is a diagram 850 illustrating another example of DCI and a common message format for a multi-user rate-splitting MIMO system. A DCI 860 may have configuration information 862 that schedules a common message 870. The common message 870 may have a data portion for one UE, such as the data portion 872 for a first UE. Other UEs that the first UE may decode the common message 870 for the purpose of SIC and decoding the private message for the other UEs. In one aspect, the DCI 860 may be a unicast DCI. The configuration information 862 may have cyclic redundancy check (CRC) scrambled with C-RNTI. The DCI 860 may not be a common DCI with CRC scrambled with a group RNTI (G-RNTI). The configuration information 862 may include a DCI field (e.g., a single bit) that indicates whether the common message 870 includes data for the UE or not. A DCI 860 with such configuration information 862 may minimizes DCI overhead. In one aspect, the DCI 860 may be a group-common DCI. The configuration information 862 may have CRC scrambled with G-RNTI. The configuration information 862 may include a DCI field (e.g., two bits for a set of four UEs, three bits for a set of eight UEs) to indicate a UE ID for which the common message 870 includes a data portion. The configuration information 862 may have an indication of which part of the data portion 872 includes data for a given UE. The PHY layer of the UE may decode the common message 870, identify the data portion of the common message 870 for the UE (e.g., data portion 872 for the first UE), and deliver the decoded data relevant to the UE to one or more layers higher than the PHY layer, such as a MAC layer or an RLC layer. The configuration information 862 may schedule the private message for the UE as well as the common message 870.

A network entity may transmit an RRC configuration for one or more types of common messages to use in a multi-user rate-splitting MIMO system in response to a trigger. For example, a network entity may transmit an RRC configuration for a common message having a header with a common message configuration for the common message (e.g., common message 670 in FIG. 6B) in response to the network entity indicating a plurality of possibilities for a common message to split to achieve plurality of different points in a rate region ($R_1$, $R_2$). In response to the network entity indicating a single possibility, the network entity may transmit an RRC configuration for a common message having a DCI scheduling a common message having one data portion for one UE, such as the DCI 860 scheduling the common message 870. A network entity may also transmit an RRC configuration of a total number of UEs that are scheduled to attempt decoding a common message and who may have data in the common message. The total number may be different from the actual number of UEs that have data portions in the common message. A table of UE IDs for UEs scheduled to attempt decoding the common message, a table of message split configurations may be provided by an RRC configuration. The length of a header or sub-headers, such as the header 612 in FIG. 6A, or the common header 672 or the sub-header 674 in FIG. 6B may be a function of the total number of UEs that are scheduled to attempt decoding a common message and who may have data in the common message. The length of a DCI-field having an index to such a table may be a function of the total number of UEs that are scheduled to attempt decoding a common message and who may have data in the common message.

Figure 9:
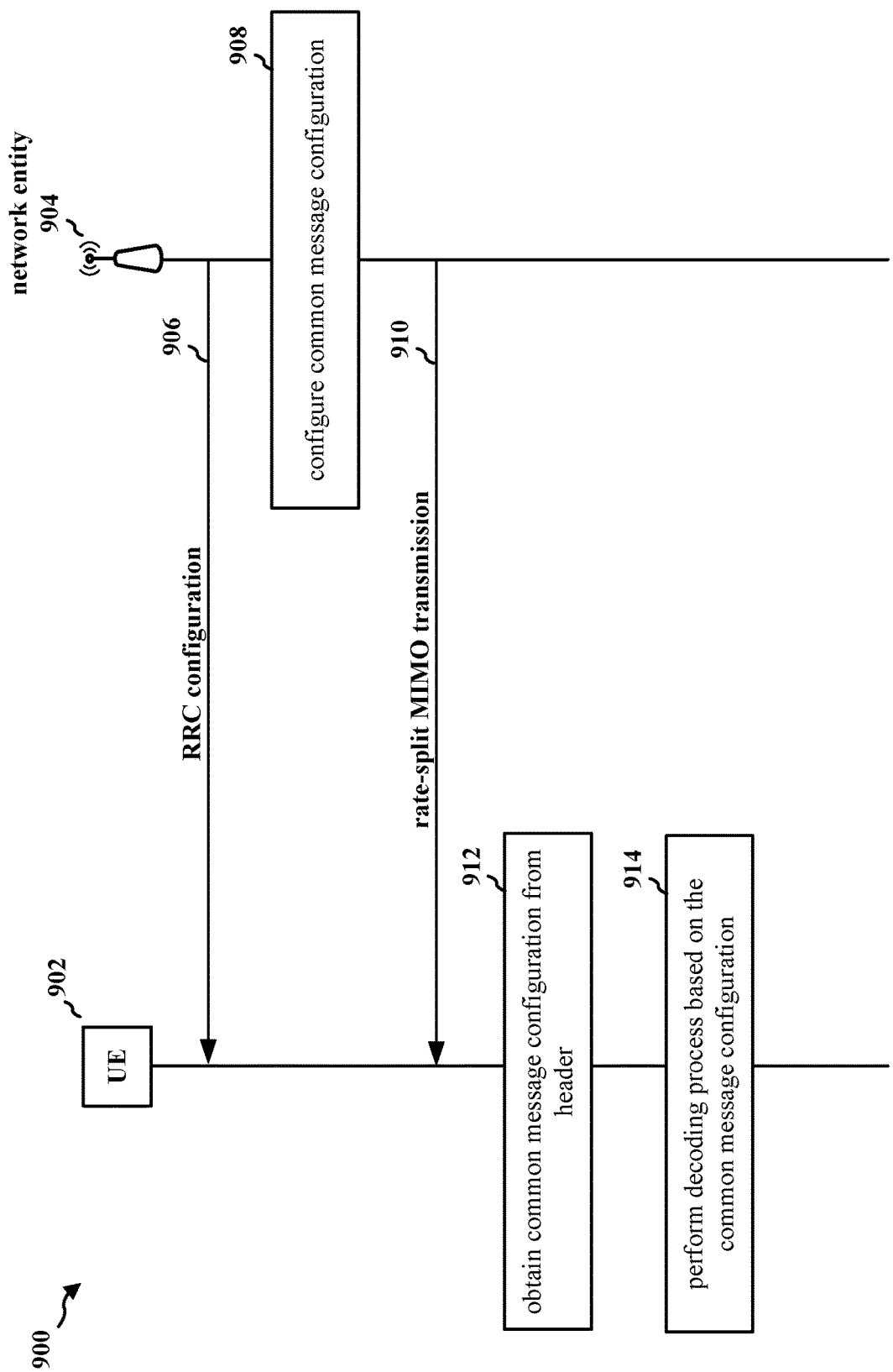
FIG. 9 is a connection flow diagram illustrating an example of a common message split communication between a UE and a network entity.

FIG. 9 is a connection flow diagram 900 illustrating an example of a common message split communication between a UE 902 and a network entity 904. The network entity 904 may output an RRC configuration 906 to the UE 902. The network entity 904 may output the RRC configuration 906 to one or more UEs, such as $UE_1$ to $UE_N$ in FIG. 7B. The UE 902 may receive the RRC configuration 906 from the network entity 904. The RRC configuration 906 may pre-define one or more possible configurations for a multi-user rate-splitting MIMO. For example, the RRC configuration 906 may have at least one of a first DCI format that includes a first field of the DCI that indicates whether the common message includes the first data portion of the common message associated with the first UE, a second DCI format that includes a second field of the DCI that indicates at least one of a first UE ID for the first UE or at least one second UE ID for the at least one second UE, a third DCI format that schedules a non-rate splitting transmission, a total number of UEs scheduled to attempt decoding the common message, a table of UE IDs for UEs scheduled to attempt decoding the common message, or a table of message split configurations. The RRC configuration may provide indications for one or more header and/or sub-header configurations for a common message, such as the header 612 in FIG. 6A, common header 672 and UE-specific sub-headers, such as sub-headers 674 and sub-header 678 in FIG. 6B, or header 712 in FIG. 7A. For example, the RRC configuration may define a packet size of data portions of a common message or may define a table of message split configurations.

At 908, the network entity may configure a common message configuration for a rate-split MIMO transmission 910. The common message configuration may be provided as one or more headers of the rate-split MIMO transmission 910, such as the header 612 in FIG. 6A, the common header 672, the sub-header 674, or the sub-header 678 in FIG. 6B, the header 712 in FIG. 7A, or the header 760 in FIG. 7B. The network entity 904 may output a rate-split MIMO transmission 910 to the UE 902. The network entity 904 may output the rate-split MIMO transmission 910 to one or more UEs, such as $UE_1$ to $UE_N$ in FIG. 7B. The rate-split MIMO transmission 910 may include one or more private messages and one or more common messages, such as the signal $Y_1 = H_1 P_c X_c + H_1 P_1 X_1 + H_1 P_2 X_2 + N_1$ or $Y_2 = H_2 P_c X_c + H_2 P_1 X_1 + H_2 P_2 X_2 + N_2$ in FIG. 4. One or more of the common messages may be configured using the common message configuration configured at 908.

At 912, the UE 902 may obtain the common message configuration from the header of the rate-split MIMO transmission 910. The header may be contiguous, as in FIG. 6A, 7A or 7B, or non-contiguous, as in FIG. 6B. The UE 902 may use the common message configuration to determine if a common message of the rate-split MIMO transmission 910 has a data portion addressed for the UE 902, and if so, where the data portion is located in the common message. The header may indicate which part of the common message includes data for the UE 902, which may be used to extract relevant data for the UE 902 once a PHY layer of the UE 902 decodes and passes the common TB or message to one or more higher layers.

At 914, the UE 902 may perform a decoding process of the rate-split MIMO transmission 910 based on the common message configuration. In one aspect, in response to the UE 902 determining that a common message of the rate-split MIMO transmission 910 does not have a data portion addressed for the UE 902, the UE 902 may forego combining the private message with the data portion of the common message when performing the decoding process. In another aspect, in response to the UE 902 determining that a common message of the rate-split MIMO transmission 910 has a data portion addressed for the UE 902, the UE 902 may combine a private message with the data portion of the common message when performing the decoding process. In either aspect, the UE 902 may decode the common message for the purpose of SIC and to decode the private message.

Figure 10:
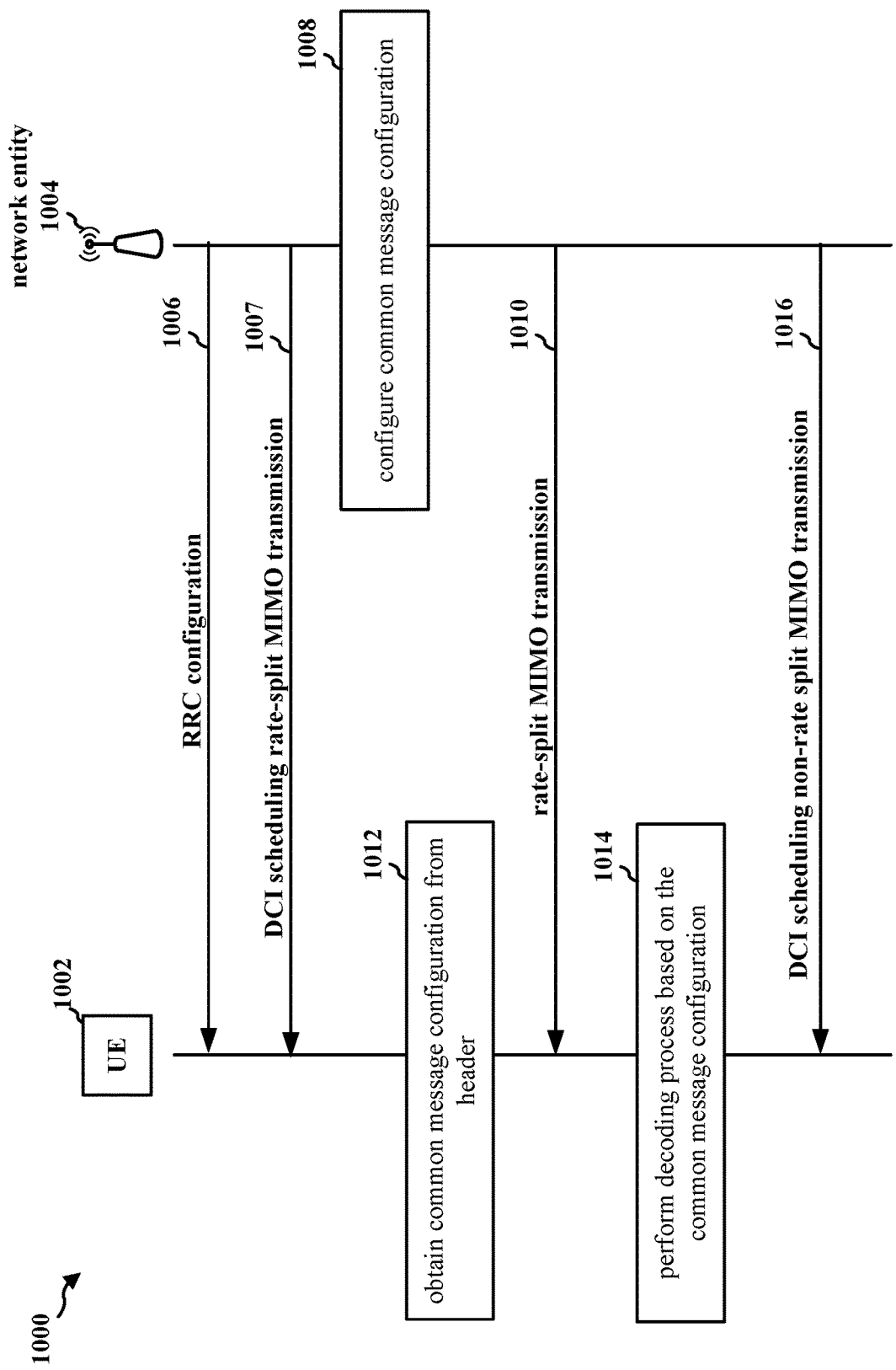
FIG. 10 is a connection flow diagram illustrating another example of a common message split communication between a UE and a network entity.

FIG. 10 is a connection flow diagram 1000 illustrating another example of a common message split communication between a UE 1002 and a network entity 1004. The network entity 1004 may output an RRC configuration 1006 to the UE 1002. The network entity 1004 may output the RRC configuration 1006 to one or more UEs, such as $UE_1$ to $UE_N$ in FIG. 7B. The UE 1002 may receive the RRC configuration 1006 from the network entity 1004. The RRC configuration 1006 may pre-define one or more possible configurations for a multi-user rate-splitting MIMO. For example, the RRC configuration 1006 may have at least one of a first DCI format that includes a first field of the DCI that indicates whether the common message includes the first data portion of the common message associated with the first UE, a second DCI format that includes a second field of the DCI that indicates at least one of a first UE ID for the first UE or at least one second UE ID for the at least one second UE, a third DCI format that schedules a non-rate splitting transmission, a total number of UEs scheduled to attempt decoding the common message, a table of UE IDs for UEs scheduled to attempt decoding the common message, or a table of message split configurations. The RRC configuration may provide indications for one or more header and/or sub-header configurations for a common message, such as the header 612 in FIG. 6A, common header 672 and UE-specific sub-headers, such as sub-headers 674 and sub-header 678 in FIG. 6B, or header 712 in FIG. 7A. For example, the RRC configuration may define a packet size of data portions of a common message or may define a table of message split configurations.

The network entity 1004 may output DCI 1007 scheduling the rate-split MIMO transmission 1010 to one or more UEs, such as $UE_1$ to $UE_N$ in FIG. 7B. The UE 1002 may receive the DCI 1007 scheduling the rate-split MIMO transmission 1010. The DCI 1007 may select a configuration of the RRC configuration 1006 output by the network entity 1004. For example, the DCI 1007 may have an index to a table of message split configurations configured by the RRC configuration 1006. The DCI 1007 may provide an indication of which part of a common message of the rate-split MIMO transmission 1010 includes data for the UE 1002.

At 1008, the network entity may configure a common message configuration for a rate-split MIMO transmission 1010. The common message configuration may be provided as one or more headers of the rate-split MIMO transmission 1010, such as the header 612 in FIG. 6A, the common header 672, the sub-header 674, or the sub-header 678 in FIG. 6B, the header 712 in FIG. 7A, or the header 760 in FIG. 7B.

At 1012, the UE 1002 may obtain the common message configuration from the header of the rate-split MIMO transmission 1010. The header may be contiguous, as in FIGS. 6A, 7A or 7B, or non-contiguous, as in FIG. 6B. The UE 1002 may use the common message configuration to determine if a common message of the rate-split MIMO transmission 1010 has a data portion addressed for the UE 1002, and if so, where the data portion is located in the common message. The header may indicate which part of the common message includes data for the UE 1002, which may be used to extract relevant data for the UE 1002 once a PHY layer of the UE 1002 decodes and passes the common TB or message to one or more higher layers.

The network entity 1004 may output a rate-split MIMO transmission 1010 to the UE 1002. The network entity 1004 may output the rate-split MIMO transmission 1010 to one or more UEs, such as $UE_1$ to $UE_N$ in FIG. 7B. The rate-split MIMO transmission 1010 may include one or more private messages and one or more common messages, such as the signal $Y_1=H_1P_cX_c+H_1P_1X_1+H_1P_2X_2+N_1$ or $Y_2=H_2P_cX_c+H_2P_1X_1+H_2P_2X_2+N_2$ in FIG. 4. One or more of the common messages may be configured using the common message configuration configured at 1008.

At 1014, the UE 1002 may perform a decoding process of the rate-split MIMO transmission 1010 based on the common message configuration. In one aspect, in response to the UE 1002 determining that a common message of the rate-split MIMO transmission 1010 does not have a data portion addressed for the UE 1002, the UE 1002 may forego combining the private message with the data portion of the common message when performing the decoding process. In another aspect, in response to the UE 1002 determining that a common message of the rate-split MIMO transmission 1010 has a data portion addressed for the UE 1002, the UE 1002 may combine a private message with the data portion of the common message when performing the decoding process. In either aspect, the UE 1002 may decode the common message for the purpose of SIC and to decode the private message.

The network entity 1004 may output a DCI 1016 scheduling a non-rate split MIMO transmission for the UE 1002. The UE 1002 may receive the DCI 1016 scheduling a non-rate split MIMO transmission for the UE 1002. The DCI 1016 scheduling a non-rate split MIMO transmission may not have the fields that the DCI 1007 scheduling the rate-split MIMO transmission has. For the example, the DCI 1007 may have a field that indicates whether the common message of a transmission includes a data portion associated with the UE 1002, and the DCI 1016 may not have that field, or the DCI 1007 may have a field that indicates a UE ID for the UE 1002 or a UE ID for one or more other UEs while the DCI 1016 may not have that field. The DCI 1016 may have a zero buffer instead of the fields that the DCI 1007 has, or the DCI 1016 may have other fields instead of the fields that the DCI 1007 has.

Figure 11:
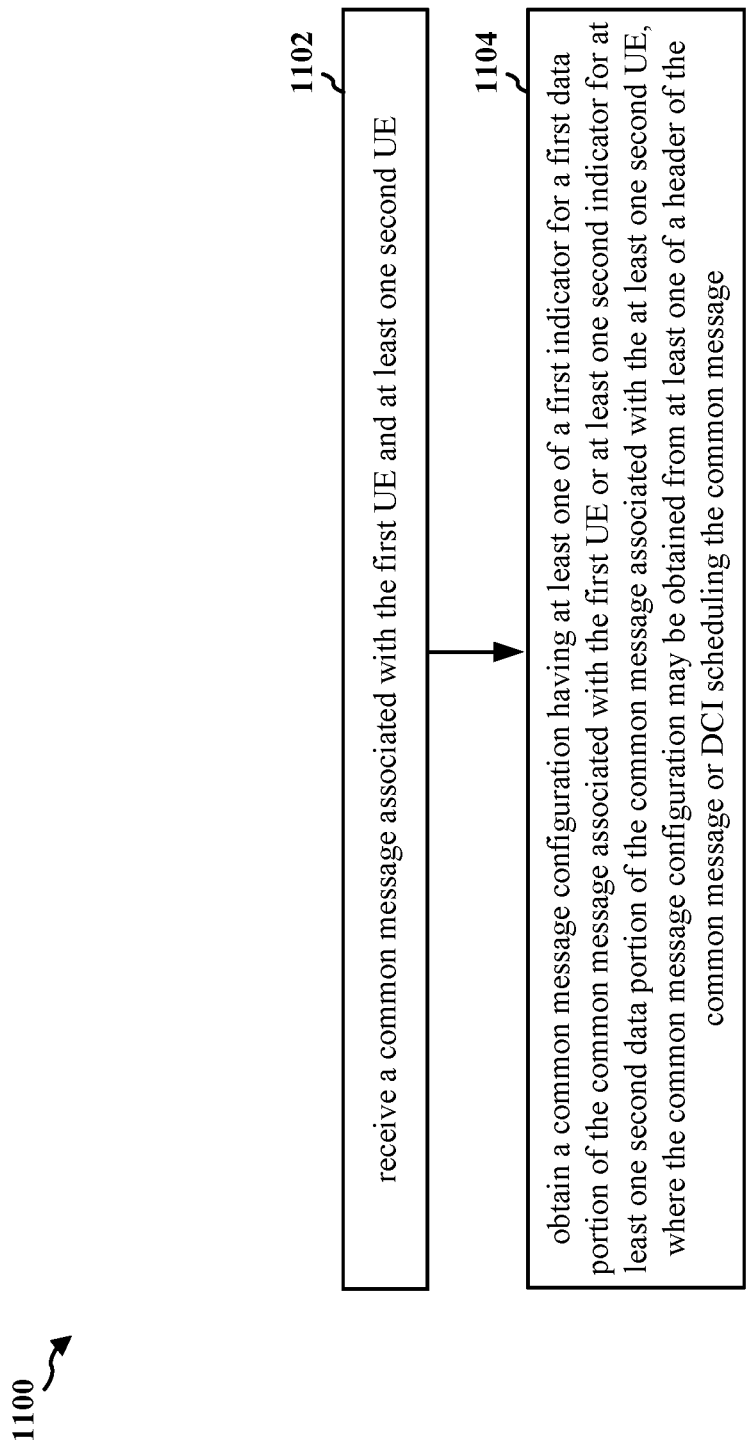
FIG. 11 is a flowchart of a method of wireless communication.

FIG. 11 is a flowchart 1100 of a method of wireless communication. The method may be performed by a UE (e.g., the UE 104, the UE 350, the $UE_1$ 416, the $UE_2$ 418, the UE 902, the UE 1002; the apparatus 1604). At 1102, the UE may receive a common message associated with the first UE and at least one second UE. For example, 1102 may be performed by the UE 1002 in FIG. 10, which may receive a common message of the rate-split MIMO transmission 1010. The common message may be associated with the UE 1002 and at least one other UE, similar to $W_c$ in FIGS. 4 and 5. Moreover, 1102 may be performed by the component 198 of apparatus 1604 in FIG. 16.

At 1104, the UE may obtain a common message configuration having at least one of a first indicator for a first data portion of the common message associated with the first UE or at least one second indicator for at least one second data portion of the common message associated with the at least one second UE. The common message configuration may be obtained from at least one of a header of the common message or DCI scheduling the common message. For example, 1104 may be performed by the UE 1002 in FIG. 10, which may obtain a common message configuration via a header of the rate-split MIMO transmission 1010 or a DCI 1007 scheduling the rate-split MIMO transmission 1010. The common message configuration may have at least one of an indicator for a data portion of the common message associated with the UE 1002 or an indicator for at least one second data portion of the common message associated with the at least one second UE, such as the data portions for $UE_2$-$UE_N$ in FIG. 7B. The common message configuration may be obtained from at least one of a header of the common message for the rate-split MIMO transmission 1010, or DCI 1007 scheduling the common message for the rate-split MIMO transmission 1010. Moreover, 1102 may be performed by the component 198 of apparatus 1604 in FIG. 16.

Figure 12:
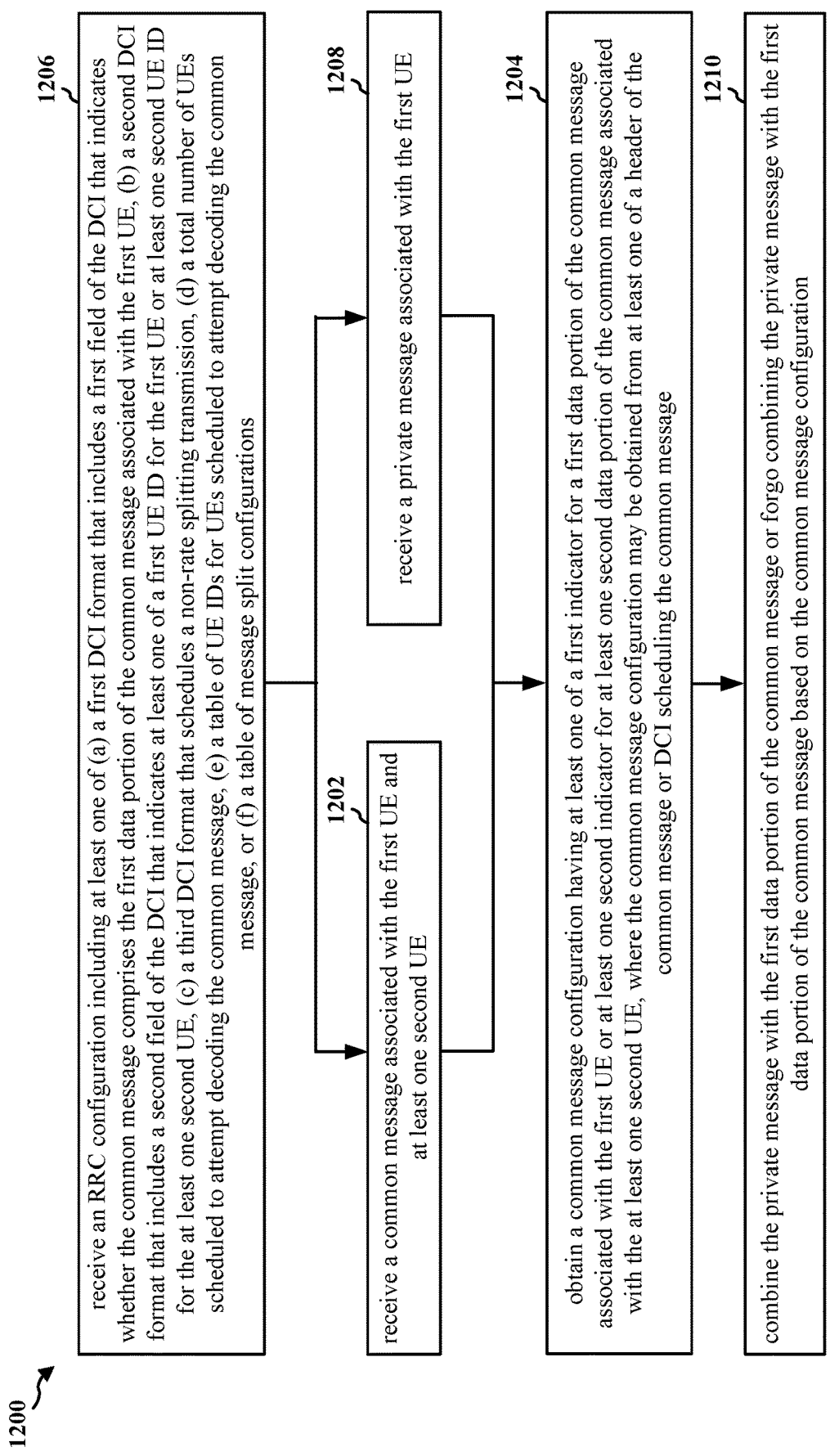
FIG. 12 is another flowchart of a method of wireless communication.

FIG. 12 is a flowchart 1200 of a method of wireless communication. The method may be performed by a UE (e.g., the UE 104, the UE 350, the $UE_1$ 416, the $UE_2$ 418, the UE 902, the UE 1002; the apparatus 1604). At 1202, the UE may receive a common message associated with the first UE and at least one second UE. For example, 1202 may be performed by the UE 1002 in FIG. 10, which may receive a common message of the rate-split MIMO transmission 1010. The common message may be associated with the UE 1002 and at least one other UE, similar to $W_c$ in FIGS. 4 and 5. Moreover, 1202 may be performed by the component 198 of apparatus 1604 in FIG. 16.

At 1204, the UE may obtain a common message configuration having at least one of a first indicator for a first data portion of the common message associated with the first UE or at least one second indicator for at least one second data portion of the common message associated with the at least one second UE. The common message configuration may be obtained from at least one of a header of the common message or DCI scheduling the common message. For example, 1204 may be performed by the UE 1002 in FIG. 10, which may obtain a common message configuration via a header of the rate-split MIMO transmission 1010 or a DCI 1007 scheduling the rate-split MIMO transmission 1010. The common message configuration may have at least one of an indicator for a data portion of the common message associated with the UE 1002 or an indicator for at least one second data portion of the common message associated with the at least one second UE, such as the data portions for $UE_2$-$UE_N$ in FIG. 7B. The common message configuration may be obtained from at least one of a header of the common message for the rate-split MIMO transmission 1010, or DCI 1007 scheduling the common message for the rate-split MIMO transmission 1010. Moreover, 1204 may be performed by the component 198 of apparatus 1604 in FIG. 16.

At 1206, the UE may receive an RRC configuration including at least one of (a) a first DCI format that includes a first field of the DCI that indicates whether the common message includes the first data portion of the common message associated with the first UE, (b) a second DCI format that includes a second field of the DCI that indicates at least one of a first UE ID for the first UE or at least one second UE ID for the at least one second UE, (c) a third DCI format that schedules a non-rate splitting transmission, (d) a total number of UEs scheduled to attempt decoding the common message, (e) a table of UE IDs for UEs scheduled to attempt decoding the common message, or (f) a table of message split configurations. For example, 1206 may be performed by the UE 1002 in FIG. 10, which may receive an RRC configuration 1006 that includes at least one of (a) a first DCI format for the DCI 1007 scheduling the rate-split MIMO transmission 1010 that includes a first field of the DCI 1007 that indicates whether the common message includes the first data portion of the common message associated with the UE 1002, (b) a second DCI format for the DCI 1007 scheduling the rate-split MIMO transmission 1010 that includes a second field of the DCI 1007 that indicates at least one of a first UE ID for the UE 1002 or at least one second UE ID for the at least one second UE (e.g., $UE_2$ to $UE_N$ referred to in FIG. 7B), (c) a third DCI format for the DCI 1016 scheduling a non-rate split MIMO transmission, (d) a total number of UEs scheduled to attempt decoding the common message, which may include the UE 1002, (e) a table of UE IDs for UEs scheduled to attempt decoding the common message, which may include the UE 1002, or (f) a table of message split configurations that may be selected by an index, such as an index of DCI 1007 scheduling the rate-split MIMO transmission 1010. Moreover, 1206 may be performed by the component 198 of apparatus 1604 in FIG. 16.

At 1208, the UE may receive a private message associated with the first UE. For example, 1208 may be performed by the UE 1002 in FIG. 10, which may receive a private message (e.g., $H_1P_1X_1$ in FIG. 5) associated with the UE 1002. Moreover, 1208 may be performed by the component 198 of apparatus 1604 in FIG. 16.

At 1210, the UE may combine the private message with the first data portion of the common message or forgo combining the private message with the first data portion of the common message based on the common message configuration. For example, 1210 may be performed by the UE 1002 in FIG. 10, which may combine the private message with the first data portion of the common message, such as by combining $W_{1,c}$ and $W_{1,p}$ to construct $W_1$ in FIG. 5, based on the common message configuration of whether the common message has a portion for the UE 1002. In another aspect, the UE 1002 may forego combining the private message with the first data portion of the common message, such as when $Y_1$ in FIG. 5 has a $H_1P_1X_1$ component but does not have a $H_1P_cX_c$ component, based on the common message configuration of whether the common message has a portion for the UE 1002. Moreover, 1210 may be performed by the component 198 of apparatus 1604 in FIG. 16.

Figure 13:
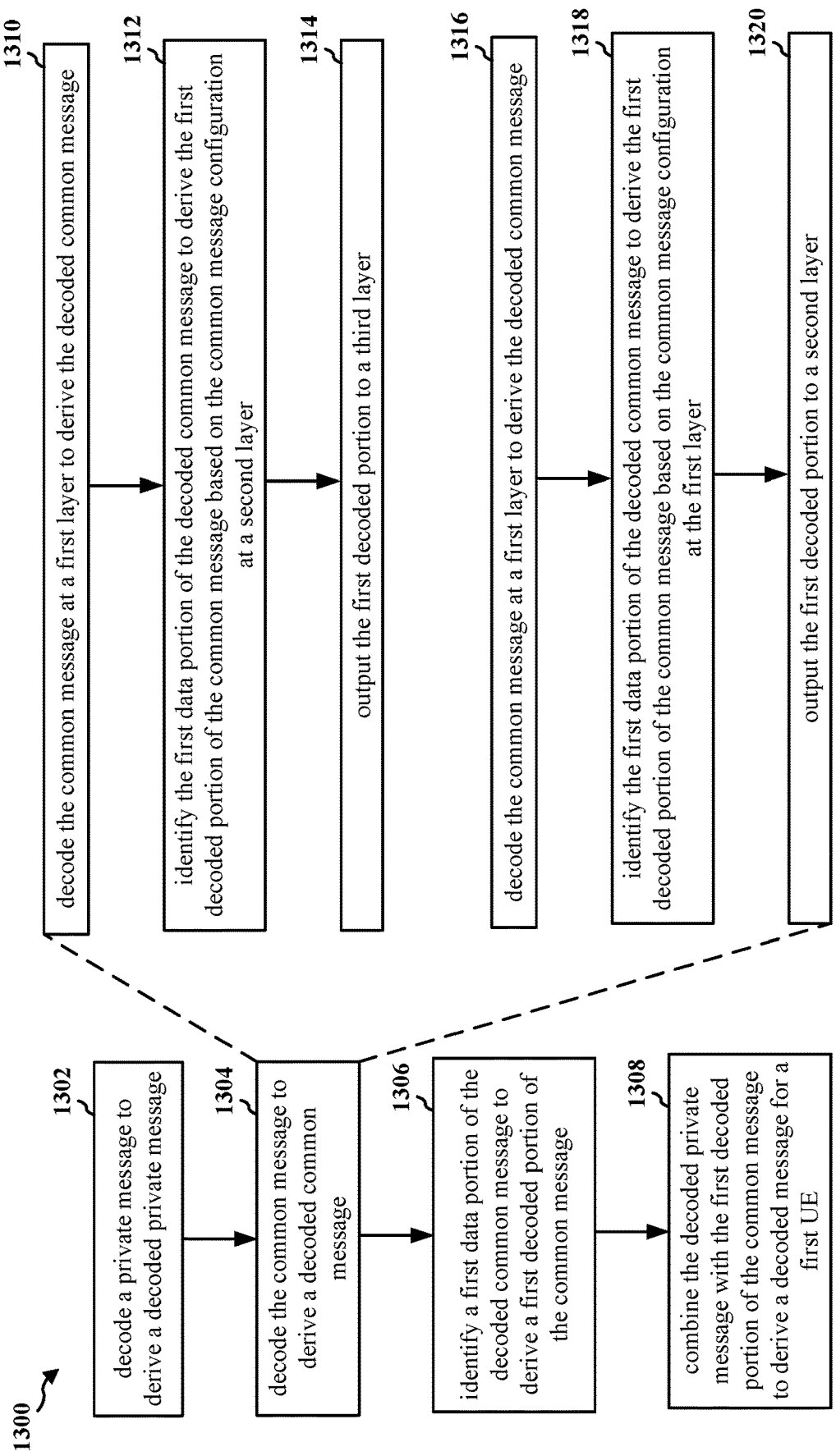
FIG. 13 is another flowchart of a method of wireless communication.

FIG. 13 is a flowchart 1300 of a method of wireless communication. The method may be performed by a UE (e.g., the UE 104, the UE 350, the $UE_1$ 416, the $UE_2$ 418, the UE 902, the UE 1002; the apparatus 1604). At 1302, the UE may decode a private message to derive a decoded private message. For example, 1302 may be performed by the $UE_1$ 416 in FIG. 5, which may decode a private message, such as the $H_1P_1X_1$ component of $Y_1$, to derive $W_{1,p}$. Moreover, 1302 may be performed by the component 198 of apparatus 1604 in FIG. 16.

At 1304, the UE may decode the common message to derive a decoded common message. For example, 1304 may be performed by the $UE_1$ 416 in FIG. 5, which may decode a common message, such as $H_1P_cX_c$, $P_cX_c$, or $X_c$, to derive $W_{1,c}$. Moreover, 1304 may be performed by the component 198 of apparatus 1604 in FIG. 16.

At 1306, the UE may identify a first data portion of the decoded common message to derive a first decoded portion of the common message. For example, 1306 may be performed by the $UE_1$ 416 in FIG. 5, which may identify a data portion of the decoded common message to derive a first decoded portion of the common message, such as $W_{1,c}$ of $W_c$. Moreover, 1306 may be performed by the component 198 of apparatus 1604 in FIG. 16.

At 1308, the UE may combine the decoded private message with the first decoded portion of the common message to derive a decoded message for a first UE. For example, 1308 may be performed by the $UE_1$ 416 in FIG. 5, which may combine the decoded private message, such as $W_{1,p}$, with the decoded portion of the common message, such as $W_c$, to derive a decoded message, such as $W_1$, for the UE 1002. Moreover, 1308 may be performed by the component 198 of apparatus 1604 in FIG. 16.

At 1310, the UE may decode the common message at a first layer to derive the decoded common message. For example, 1310 may be performed by the $UE_1$ 416 in FIG. 5, which may decode the common message, such as $H_1P_cX_c$, $P_cX_c$, or $X_c$, at a first layer, such as a PHY layer, to derive the decoded common message, such as $W_c$. Moreover, 1310 may be performed by the component 198 of apparatus 1604 in FIG. 16.

At 1312, the UE may identify the first data portion of the decoded common message to derive the first decoded portion of the common message based on the common message configuration at a second layer. For example, 1312 may be performed the $UE_1$ 416 in FIG. 5, which may identify the first data portion of the decoded common message, such as $W_c$, to derive the first decoded portion of the common message, such as $W_{1,c}$, based on the common message configuration at a second layer, such as a MAC layer. Moreover, 1312 may be performed by the component 198 of apparatus 1604 in FIG. 16.

At 1314, the UE may output the first decoded portion to a third layer. For example, 1314 may be performed by the $UE_1$ 416 in FIG. 5, which may output the first decoded portion, such as $W_{1,c}$, to a third layer, such as an RLC layer. Moreover, 1314 may be performed by the component 198 of apparatus 1604 in FIG. 16.

At 1316, the UE may decode the common message at a first layer to derive the decoded common message. For example, 1316 may be performed by the $UE_1$ 416 in FIG. 5, which may decode the common message, such as $H_1P_cX_c$, $P_cX_c$, or $X_c$, at a first layer, such as a PHY layer, to derive the decoded common message, such as $W_c$. Moreover, 1316 may be performed by the component 198 of apparatus 1604 in FIG. 16.

At 1318, the UE may identify the first data portion of the decoded common message to derive the first decoded portion of the common message based on the common message configuration at the first layer. For example, 1318 may be performed by the $UE_1$ 416 in FIG. 5, which may identify the first data portion of the decoded common message, such as $W_c$, to derive the first decoded portion of the common message, such as $W_{1,c}$, based on the common message configuration at the first layer, such as the PHY layer. Moreover, 1318 may be performed by the component 198 of apparatus 1604 in FIG. 16.

At 1320, the UE may output the first decoded portion to a second layer. For example, 1320 may be performed by output the first decoded portion, such as $W_{1,c}$, to a second layer, such as a MAC or an RLC layer. Moreover, 1320 may be performed by the component 198 of apparatus 1604 in FIG. 16.

Figure 14:
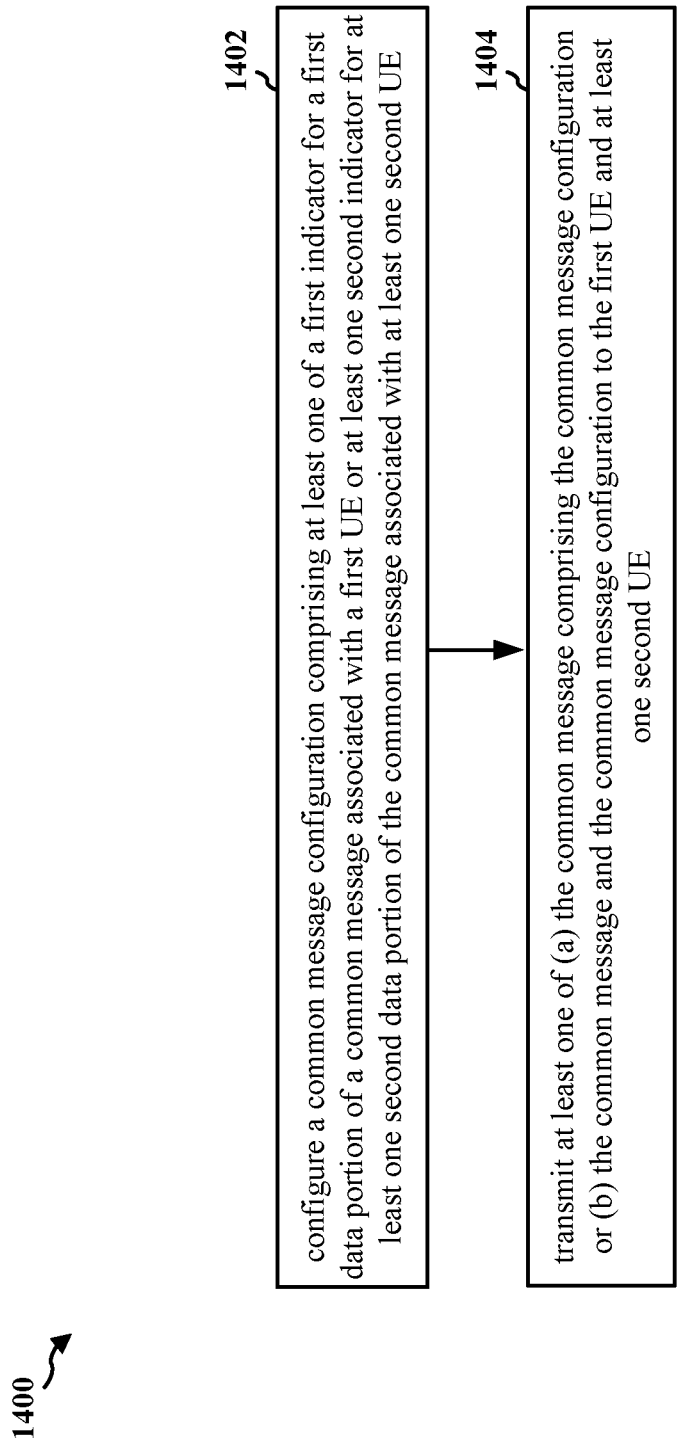
FIG. 14 is another flowchart of a method of wireless communication.

FIG. 14 is a flowchart 1400 of a method of wireless communication. The method may be performed by a network entity (e.g., the base station 102, the base station 310; the network entity 904, the network entity 1004, the network entity 1602, the network entity 1702). At 1402, the network entity may configure a common message configuration including at least one of a first indicator for a first data portion of a common message associated with a first UE or at least one second indicator for at least one second data portion of the common message associated with at least one second UE. For example, 1402 may be performed by the network entity 1004 in FIG. 10, which may configure a common message configuration including at least one of an indicator for a data portion of a common message associated with the UE 1002 or an indicator for at least one second data portion of the common message associated with at least one second UE, such as $UE_2$ to $UE_N$ in FIG. 7B. Moreover, 1402 may be performed by the component 199 of network entity 1702 in FIG. 17.

At 1404, the network entity may transmit at least one of (a) the common message including the common message configuration or (b) the common message and the common message configuration to the first UE and at least one second UE. For example, 1404 may be performed by the network entity 1004 in FIG. 10, which may transmit at least one of (a) the common message including the common message configuration as the rate-split MIMO transmission 1010 or (b) the common message as the rate-split MIMO transmission and the common message configuration as the DCI 1007 scheduling the rate-split MIMO transmission 1010 to the UE 1002 and at least one second UE, such as $UE_2$ to $UE_N$ in FIG. 7B. Moreover, 1404 may be performed by the component 199 of network entity 1702 in FIG. 17.

Figure 15:
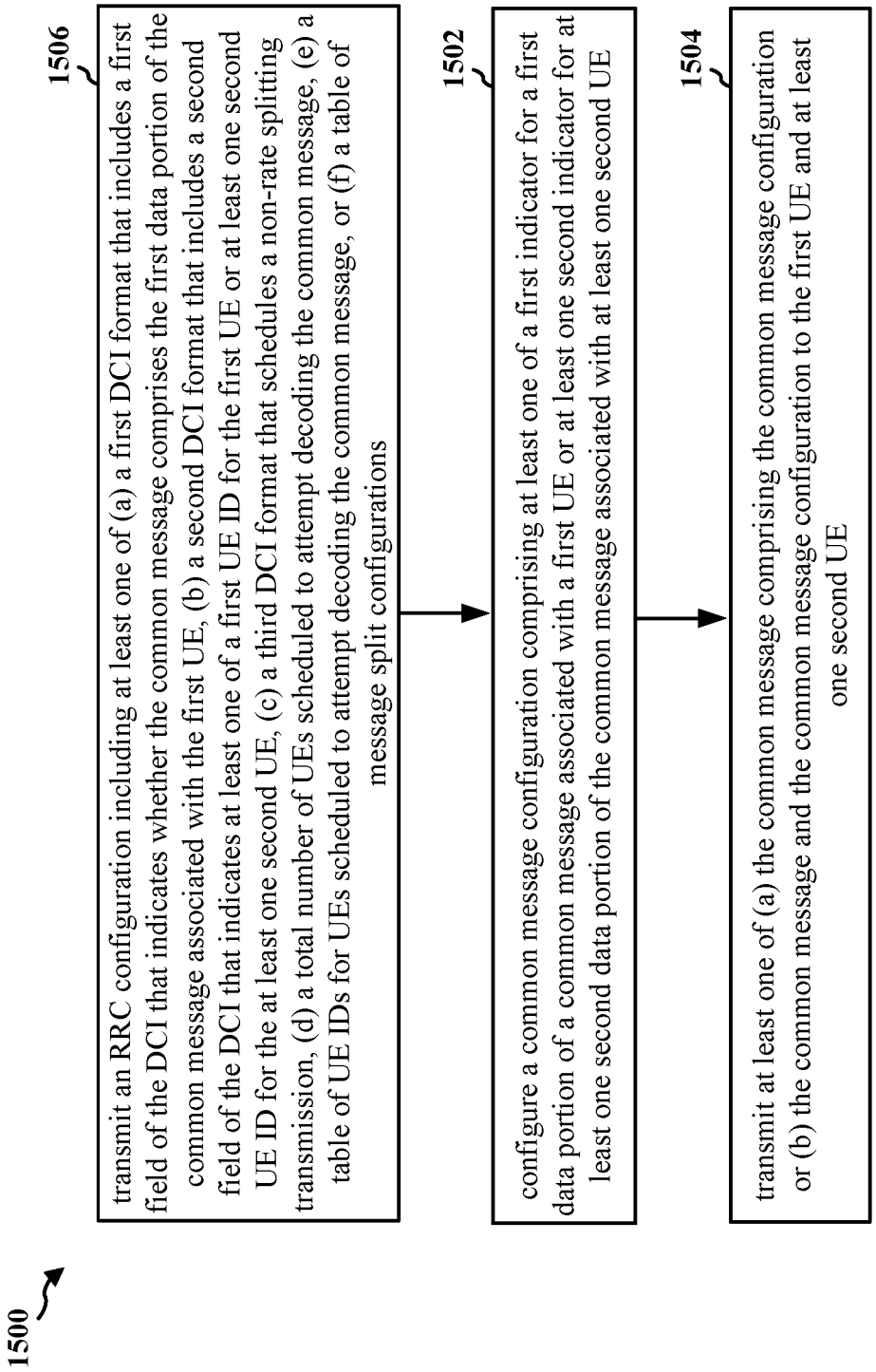
FIG. 15 is another flowchart of a method of wireless communication.

FIG. 15 is a flowchart 1500 of a method of wireless communication. The method may be performed by a network entity (e.g., the base station 102, the base station 310; the network entity 904, the network entity 1004, the network entity 1602, the network entity 1702). At 1502, the network entity may configure a common message configuration including at least one of a first indicator for a first data portion of a common message associated with a first UE or at least one second indicator for at least one second data portion of the common message associated with at least one second UE. For example, 1502 may be performed by the network entity 1004 in FIG. 10, which may configure a common message configuration including at least one of an indicator for a data portion of a common message associated with the UE 1002 or an indicator for at least one second data portion of the common message associated with at least one second UE, such as $UE_2$ to $UE_N$ in FIG. 7B. Moreover, 1502 may be performed by the component 199 of network entity 1702 in FIG. 17.

At 1504, the network entity may transmit at least one of (a) the common message including the common message configuration or (b) the common message and the common message configuration to the first UE and at least one second UE. For example, 1504 may be performed by the network entity 1004 in FIG. 10, which may transmit at least one of (a) the common message including the common message configuration as the rate-split MIMO transmission 1010 or (b) the common message as the rate-split MIMO transmission and the common message configuration as the DCI 1007 scheduling the rate-split MIMO transmission 1010 to the UE 1002 and at least one second UE, such as $UE_2$ to $UE_N$ in FIG. 7B. Moreover, 1504 may be performed by the component 199 of network entity 1702 in FIG. 17.

At 1506, the network entity may transmit an RRC configuration including at least one of (a) a first DCI format that includes a first field of the DCI that indicates whether the common message includes the first data portion of the common message associated with the first UE, (b) a second DCI format that includes a second field of the DCI that indicates at least one of a first UE ID for the first UE or at least one second UE ID for the at least one second UE, (c) a third DCI format that schedules a non-rate splitting transmission, (d) a total number of UEs scheduled to attempt decoding the common message, (e) a table of UE IDs for UEs scheduled to attempt decoding the common message, or (f) a table of message split configurations. For example, 1506 may be performed by the network entity 1004 in FIG. 10, which may transmit an RRC configuration 1006 that includes at least one of (a) a first DCI format for the DCI 1007 scheduling the rate-split MIMO transmission 1010 that includes a first field of the DCI 1007 that indicates whether the common message includes the first data portion of the common message associated with the UE 1002, (b) a second DCI format for the DCI 1007 scheduling the rate-split MIMO transmission 1010 that includes a second field of the DCI 1007 that indicates at least one of a first UE ID for the UE 1002 or at least one second UE ID for the at least one second UE (e.g., $UE_2$ to $UE_N$ referred to in FIG. 7B), (c) a third DCI format for the DCI 1016 scheduling a non-rate split MIMO transmission, (d) a total number of UEs scheduled to attempt decoding the common message, which may include the UE 1002, (e) a table of UE IDs for UEs scheduled to attempt decoding the common message, which may include the UE 1002, or (f) a table of message split configurations that may be selected by an index, such as an index of DCI 1007 scheduling the rate-split MIMO transmission 1010. Moreover, 1504 may be performed by the component 199 of network entity 1702 in FIG. 17.

Figure 16:
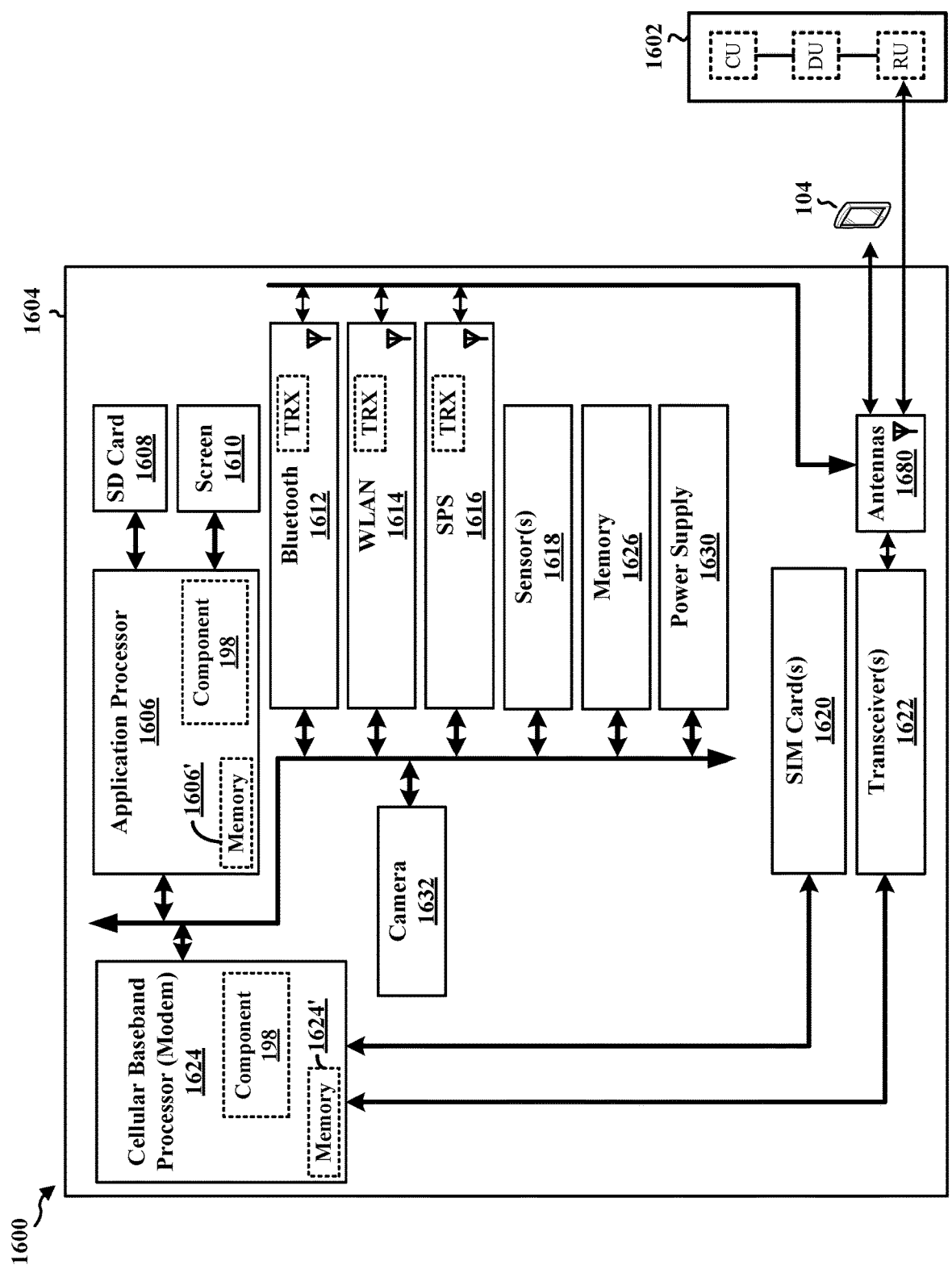
FIG. 16 is a diagram illustrating an example of a hardware implementation for an example apparatus and/or network entity.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include a cellular baseband processor 1624 (also referred to as a modem) coupled to one or more transceivers 1622 (e.g., cellular RF transceiver). The cellular baseband processor 1624 may include on-chip memory 1624'. In some aspects, the apparatus 1604 may further include one or more subscriber identity modules (SIM) cards 1620 and an application processor 1606 coupled to a secure digital (SD) card 1608 and a screen 1610. The application processor 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (Rx)). The Bluetooth module 1612, the WLAN module 1614, and the SPS module 1616 may include their own dedicated antennas and/or utilize the antennas 1680 for communication. The cellular baseband processor 1624 communicates through the transceiver(s) 1622 via one or more antennas 1680 with the UE 104 and/or with an RU associated with a network entity 1602. The cellular baseband processor 1624 and the application processor 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described supra. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the Tx processor 368, the Rx processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., see UE 350 of FIG. 3) and include the additional modules of the apparatus 1604.

As discussed supra, the component 198 is configured to receive a common message associated with the first UE and at least one second UE. The component 198 may be configured to obtain a common message configuration having at least one of a first indicator for a first data portion of the common message associated with the first UE or at least one second indicator for at least one second data portion of the common message associated with the at least one second UE. The common message configuration may be obtained from at least one of a header of the common message or DCI scheduling the common message. The component 198 may be within the cellular baseband processor 1624, the application processor 1606, or both the cellular baseband processor 1624 and the application processor 1606. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, includes means for receiving a common message associated with the first UE and at least one second UE. The apparatus 1604 may include means for obtaining a common message configuration including at least one of a first indicator for a first data portion of the common message associated with the first UE or at least one second indicator for at least one second data portion of the common message associated with the at least one second UE. The apparatus 1604 may include means for receiving a private message associated with the first UE. The apparatus 1604 may include means for combining the private message with the first data portion of the common message or forgo combining the private message with the first data portion of the common message based on the common message configuration. The apparatus 1604 may include means for combining the private message with the first data portion of the common message by decoding the private message to derive a decoded private message. The apparatus 1604 may include means for combining the private message with the first data portion of the common message by decoding the common message to derive a decoded common message. The apparatus 1604 may include means for combining the private message with the first data portion of the common message by identifying the first data portion of the decoded common message to derive a first decoded portion of the common message. The apparatus 1604 may include means for combining the private message with the first data portion of the common message by combining the decoded private message with the first decoded portion of the common message to derive a decoded message for the first UE. The apparatus 1604 may include means for receiving an RRC configuration having at least one of a first DCI format that includes a first field of the DCI that indicates whether the common message includes the first data portion of the common message associated with the first UE, a second DCI format that includes a second field of the DCI that indicates at least one of a first UE ID for the first UE or at least one second UE ID for the at least one second UE, a third DCI format that schedules a non-rate splitting transmission, a total number of UEs scheduled to attempt decoding the common message, a table of UE IDs for UEs scheduled to attempt decoding the common message, or a table of message split configurations. The means may be the component 198 of the apparatus 1604 configured to perform the functions recited by the means. As described supra, the apparatus 1604 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 17:
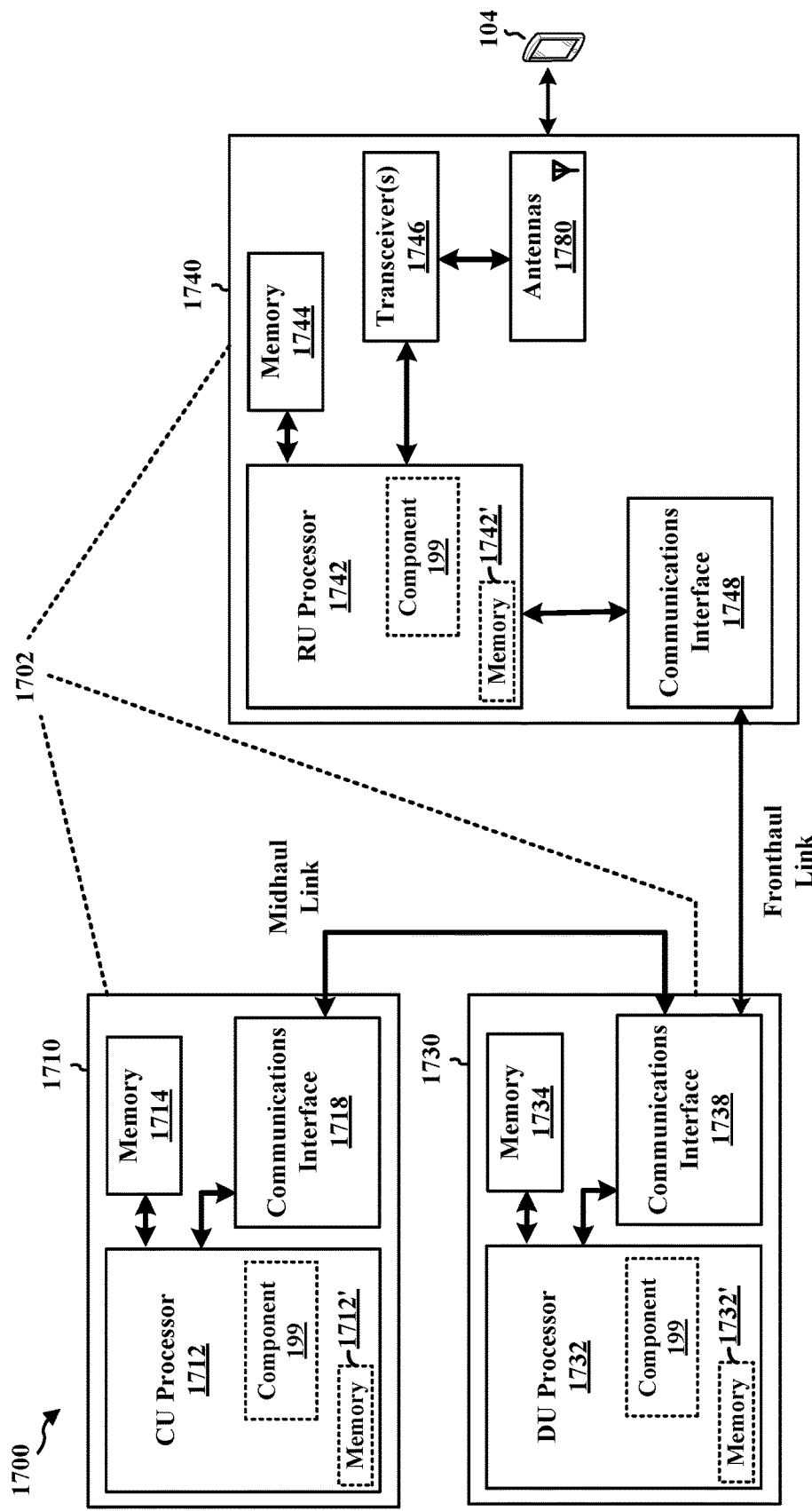
FIG. 17 is a diagram illustrating an example of a hardware implementation for an example network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra.

The computer-readable medium/memory may also be used for storing data that is manipulated by the processor(s) when executing software.

As discussed supra, the component 199 is configured to configure a common message configuration having at least one of a first indicator for a first data portion of a common message associated with a first UE or at least one second indicator for at least one second data portion of the common message associated with at least one second UE. The component 199 may be configured to transmit at least one of (a) the common message having the common message configuration or (b) the common message and the common message configuration to the first UE and at least one second UE. The component 199 may be within one or more processors of one or more of the CU 1710, DU 1730, and the RU 1740. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 includes means for configuring a common message configuration including at least one of a first indicator for a first data portion of a common message associated with a first UE or at least one second indicator for at least one second data portion of the common message associated with at least one second UE. The network entity 1702 may include means for transmitting at least one of (a) the common message including the common message configuration or (b) the common message and the common message configuration to the first UE and the at least one second UE. The network entity 1702 may include means for transmitting an RRC configuration including at least one of a first DCI format that includes a first field of DCI that indicates whether the common message includes the first data portion of the common message associated with the first UE, a second DCI format that includes a second field of the DCI that indicates at least one of a first UE ID for the first UE or at least one second UE ID for the at least one second UE, a third DCI format that schedules a non-rate splitting transmission, a total number of UEs scheduled to attempt decoding the common message, a table of UE IDs for UEs scheduled to attempt decoding the common message, or a table of message split configurations. The means may be the component 199 of the network entity 1702 configured to perform the functions recited by the means. As described supra, the network entity 1702 may include the Tx processor 316, the Rx processor 370, and the controller/processor 375. As such, in one configuration, the means may be the Tx processor 316, the Rx processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, where the method may include receiving a common message associated with the first UE and at least one second UE. The method may further include obtaining a common message configuration including at least one of a first indicator for a first data portion of the common message associated with the first UE or at least one second indicator for at least one second data portion of the common message associated with the at least one second UE. The common message configuration may be obtained from at least one of a header of the common message or DCI scheduling the common message.

Aspect 2 is the method of aspect 1, where the method may include receiving a private message associated with the first UE. The method may further include combining the private message with the first data portion of the common message or forgo combining the private message with the first data portion of the common message based on the common message configuration.

Aspect 3 is the method of aspect 2, where the method may include combining the private message with the first data portion of the common message by decoding the private message to derive a decoded private message. The method may include combining the private message with the first data portion of the common message by decoding the common message to derive a decoded common message. The method may include combining the private message with the first data portion of the common message by identifying the first data portion of the decoded common message to derive a first decoded portion of the common message. The method may include combining the private message with the first data portion of the common message by combining the decoded private message with the first decoded portion of the common message to derive a decoded message for the first UE.

Aspect 4 is the method of any of aspects 1 to 3, where the header includes at least one of a first UE identifier (ID) for the first UE, at least one second UE ID for the at least one second UE, an order of the first data portion and the at least one second data portion, a first packet size for the first data portion, at least one second packet size for the at least one second data portion, a number of UEs having data portions encoded in the common message, or an index to a table of message split configurations.

Aspect 5 is the method of aspect 4, where the header may be contiguous in the common message. The header may include a MAC header.

Aspect 6 is the method of any of aspects 4 to 5, where the UE ID may include at least one of a C-RNTI or an index for a table of UEs including the first UE and the at least one second UE.

Aspect 7 is the method of any of aspects 4 to 6, where the first packet size of the first data portion of the common message may be equal to the at least one second packet size of the at least one second data portion of the common message. The first packet size may be based on the number of UEs associated with the common message.

Aspect 8 is the method of any of aspects 4 to 7, where the header may include a fourth set of sub-headers that are non-contiguous in the common message. Each of the fourth set of sub-headers may include a MAC header. The fourth set of sub-headers may include a first sub-header having a first UE ID for the first UE preceding the first data portion and at least one second sub-header having at least one second UE ID for the at least one second UE preceding the at least one second data portion.

Aspect 9 is the method of any of aspects 1 to 8, where the DCI includes a private message configuration.

Aspect 10 is the method of any of aspects 1 to 9, where the DCI includes unicast DCI. The DCI may include CRC scrambled with C-RNTI. The DCI may include a field that indicates whether the common message includes the first data portion of the common message associated with the first UE.

Aspect 11 is the method of any of aspects 1 to 10, where the DCI may include group-common DCI. The DCI may include CRC scrambled with G-RNTI. The DCI may include a field that indicates at least one of a first UE ID for the first UE or at least one second UE ID for the at least one second UE.

Aspect 12 is the method of any of aspects 1 to 11, where the method may include receiving an RRC configuration having at least one of a first DCI format that includes a first field of the DCI that indicates whether the common message includes the first data portion of the common message associated with the first UE, a second DCI format that includes a second field of the DCI that indicates at least one of a first UE ID for the first UE or at least one second UE ID for the at least one second UE, a third DCI format that schedules a non-rate splitting transmission, a total number of UEs scheduled to attempt decoding the common message, a table of UE IDs for UEs scheduled to attempt decoding the common message, or a table of message split configurations.

Aspect 13 is the method of aspect 3, where the method may include decoding the common message by decoding the common message at a first layer to derive the decoded common message. The method may include decoding the common message by identifying the first data portion of the decoded common message to derive the first decoded portion of the common message based on the common message configuration at a second layer. The method may include decoding the common message by outputting the first decoded portion to a third layer.

Aspect 14 is the method of aspect 3, where the method may include decoding the common message by decoding the common message at a first layer to derive the decoded common message. The method may include decoding the common message by identifying the first data portion of the decoded common message to derive the first decoded portion of the common message based on the common message configuration at the first layer. The method may include decoding the common message by outputting the first decoded portion to a second layer.

Aspect 15 is a method of wireless communication at a network entity, where the method may include configuring a common message configuration including at least one of a first indicator for a first data portion of a common message associated with a first UE or at least one second indicator for at least one second data portion of the common message associated with at least one second UE. The method may further include transmitting at least one of (a) the common message including the common message configuration or (b) the common message and the common message configuration to the first UE and the at least one second UE.

Aspect 16 is the method of aspect 15, where the common message configuration may be included in a header of the common message.

Aspect 17 is the method of aspect 16, where the header may be contiguous in the common message. The header may include a MAC header.

Aspect 18 is the method of any of aspects 16 to 17, where the header includes at least one of a first UE ID for the first UE, at least one second UE ID for the at least one second UE, an order of the first data portion and the at least one second data portion, a first packet size for the first data portion, at least one second packet size for the at least one second data portion, a number of UEs having data portions encoded in the common message, or an index to a table of message split configurations.

Aspect 19 is the method of aspect 18, where the UE ID may include at least one of a C-RNTI or an index for a table of UEs including the first UE and the at least one second UE.

Aspect 20 is the method of any of aspects 18 to 19, where the first packet size of the first data portion of the common message may be equal to the at least one second packet size of the at least one second data portion of the common message. The first packet size may be based on the number of UEs associated with the common message.

Aspect 21 is the method of any of aspects 16 to 20, where the header may include a fourth set of sub-headers that are non-contiguous in the common message. The fourth set of sub-headers may include a first sub-header including a first UE ID for the first UE preceding the first data portion and at least one second sub-header including at least one second UE ID for the at least one second UE preceding the at least one second data portion.

Aspect 22 is the method of aspect 15, where the common message configuration may be included in DCI.

Aspect 23 is the method of aspect 22, where the DCI may include a private message configuration.

Aspect 24 is the method of any of aspects 22 to 23, where the DCI may be unicast. The DCI may include CRC scrambled with C-RNTI. The DCI may include a field that indicates whether the common message includes the first data portion of the common message associated with the first UE.

Aspect 25 is the method of any of aspects 22 to 23, where the DCI may be group-common. The DCI may include CRC scrambled with G-RNTI. The DCI may include a field that indicates at least one of a first UE ID for the first UE or at least one second UE ID for the at least one second UE.

Aspect 26 is the method of any of aspects 15 to 25, where the method may include transmitting an RRC configuration including at least one of a first DCI format that includes a first field of DCI that indicates whether the common message includes the first data portion of the common message associated with the first UE, a second DCI format that includes a second field of the DCI that indicates at least one of a first UE ID for the first UE or at least one second UE ID for the at least one second UE, a third DCI format that schedules a non-rate splitting transmission, a total number of UEs scheduled to attempt decoding the common message, a table of UE IDs for UEs scheduled to attempt decoding the common message, or a table of message split configurations.

Aspect 27 is an apparatus for wireless communication, including: a memory; and at least one processor coupled to the memory and, based at least in part on information stored in the memory, the at least one processor is configured to implement any of aspects 1 to 26.

Aspect 28 is the apparatus of aspect 27, further including at least one of an antenna or a transceiver coupled to the at least one processor.

Aspect 29 is an apparatus for wireless communication including means for implementing any of aspects 1 to 26.

Aspect 30 is a computer-readable medium (e.g., a non-transitory computer-readable medium) storing computer executable code, where the code when executed by a processor causes the processor to implement any of aspects 1 to 26.

What is claimed is:

1. An apparatus for wireless communication at a first user equipment (UE), comprising:
a memory; and
at least one processor coupled to the memory and, based at least in part on information stored in the memory, the at least one processor is configured to:
  receive a common message associated with the first UE and at least one second UE;
  obtain a common message configuration comprising at least one of a first indicator for a first data portion of the common message associated with the first UE or at least one second indicator for at least one second data portion of the common message associated with the at least one second UE, wherein the common message configuration is obtained from at least one of a header of the common message or downlink control information (DCI) scheduling the common message;
a transceiver coupled to the at least one processor, wherein the at least one processor is further configured to:
  receive, via the transceiver, a private message associated with the first UE; and
  combine the private message with the first data portion of the common message or forgo combining the private message with the first data portion of the common message based on the common message configuration,
wherein to combine the private message with the first data portion of the common message, the at least one processor is configured to:
  decode the private message to derive a decoded private message;
  decode the common message to derive a decoded common message,
  identify a first data portion of the decoded common message to derive a first decoded portion of the common message; and
  combine the decoded private message with the first decoded portion of the common message to derive a decoded message for the first UE;
wherein to decode the common message, the at least one processor is configured to:
  decode the common message at a first layer to derive the decoded common message;
  identify the first data portion of the decoded common message to derive the first decoded portion of the common message based on the common message configuration at a second layer; and
  output the first decoded portion to a third layer.

2. The apparatus of claim 1, wherein the header comprises at least one of a first UE identifier (ID) for the first UE, at least one second UE ID for the at least one second UE, an order of the first data portion and the at least one second data portion, a first packet size for the first data portion, at least one second packet size for the at least one second data portion, a number of UEs having data portions encoded in the common message, or an index to a table of message split configurations.

3. The apparatus of claim 2, wherein the header is contiguous in the common message, wherein the header comprises a medium access control (MAC) header.

4. The apparatus of claim 2, wherein the UE ID comprises at least one of a cell radio network temporary identifier (C-RNTI) or a second index for a second table of UEs comprising the first UE and the at least one second UE.

5. The apparatus of claim 2, wherein the first packet size of the first data portion of the common message is equal to the at least one second packet size of the at least one second data portion of the common message, wherein the first packet size is based on the number of UEs associated with the common message.

6. The apparatus of claim 2, wherein the header comprises a fourth set of sub-headers that are non-contiguous in the common message, wherein each of the fourth set of sub-headers comprise a medium access control (MAC) header, wherein the fourth set of sub-headers comprises a first sub-header comprising a first UE ID for the first UE preceding the first data portion and at least one second sub-header comprising the at least one second UE ID for the at least one second UE preceding the at least one second data portion.

7. The apparatus of claim 1, wherein the DCI comprises a private message configuration.

8. The apparatus of claim 1, wherein the DCI comprises unicast DCI, wherein the DCI comprises cyclic redundancy check (CRC) scrambled with C-RNTI, wherein the DCI comprises a field that indicates whether the common message comprises the first data portion of the common message associated with the first UE.

9. The apparatus of claim 1, wherein the DCI comprises group-common DCI, wherein the DCI comprises CRC scrambled with group RNTI (G-RNTI), wherein the DCI comprises a field that indicates at least one of a first UE ID for the first UE or at least one second UE ID for the at least one second UE.

10. The apparatus of claim 1, wherein the at least one processor is further configured to:
receive a radio resource control (RRC) configuration comprising at least one of a first DCI format that includes a first field of the DCI that indicates whether the common message comprises the first data portion of the common message associated with the first UE, a second DCI format that includes a second field of the DCI that indicates at least one of a first UE ID for the first UE or at least one second UE ID for the at least one second UE, a third DCI format that schedules a non-rate splitting transmission, a total number of UEs scheduled to attempt decoding the common message, a table of UE IDs for UEs scheduled to attempt decoding the common message, or a table of message split configurations.

11. An apparatus for wireless communication at a network entity, comprising:
a memory; and
at least one processor coupled to the memory and, based at least in part on information stored in the memory, the at least one processor is configured to:
configure a common message configuration comprising at least one of a first indicator for a first data portion of a common message associated with a first UE or at least one second indicator for at least one second data portion of the common message associated with at least one second UE;
transmit at least one of (a) the common message comprising the common message configuration or (b) the common message and the common message configuration to the first UE and the at least one second UE;
wherein the common message configuration is included in a header of the common message; and
wherein the header comprises a fourth set of sub-headers that are non-contiguous in the common message, wherein the fourth set of sub-headers comprises a first sub-header comprising a first UE ID for the first UE preceding the first data portion and at least one second sub-header comprising at least one second UE ID for the at least one second UE preceding the at least one second data portion.

12. The apparatus of claim 11, wherein the header is contiguous in the common message, wherein the header comprises a medium access control (MAC) header.

13. The apparatus of claim 11, wherein the header comprises at least one of a first UE identifier (ID) for the first UE, at least one second UE ID for the at least one second UE, an order of the first data portion and the at least one second data portion, a first packet size for the first data portion, at least one second packet size for the at least one second data portion, a number of UEs having data portions encoded in the common message, or an index to a table of message split configurations.

14. The apparatus of claim 13, wherein the UE ID comprises at least one of a cell radio network temporary identifier (C-RNTI) or a second index for a second table of UEs comprising the first UE and the at least one second UE.

15. The apparatus of claim 13, wherein the first packet size of the first data portion of the common message is equal to the at least one second packet size of the at least one second data portion of the common message, wherein the first packet size is based on the number of UEs associated with the common message.

16. The apparatus of claim 11, wherein the common message configuration is included in downlink control information (DCI).

17. The apparatus of claim 16, wherein the DCI comprises a private message configuration.

18. The apparatus of claim 16, wherein the DCI is unicast, wherein the DCI comprises cyclic redundancy check (CRC) scrambled with C-RNTI, wherein the DCI comprises a field that indicates whether the common message comprises the first data portion of the common message associated with the first UE.

19. The apparatus of claim 16, wherein the DCI is group-common, wherein the DCI comprises CRC scrambled with group RNTI (G-RNTI), wherein the DCI comprises a field that indicates at least one of a first UE ID for the first UE or at least one second UE ID for the at least one second UE.

20. The apparatus of claim 11, wherein the at least one processor is further configured to:
transmit a radio resource control (RRC) configuration comprising at least one of a first DCI format that includes a first field of DCI that indicates whether the common message comprises the first data portion of the common message associated with the first UE, a second DCI format that includes a second field of the DCI that indicates at least one of a first UE ID for the first UE or at least one second UE ID for the at least one second UE, a third DCI format that schedules a non-rate splitting transmission, a total number of UEs scheduled to attempt decoding the common message, a table of UE IDs for UEs scheduled to attempt decoding the common message, or a table of message split configurations.

21. The apparatus of claim 11, further comprising a transceiver coupled to the at least one processor, wherein the at least one processor is further configured to transmit at least one of (a) the common message comprising the common message configuration or (b) the common message and the common message configuration to the first UE and the at least one second UE using the transceiver.

22. A method of wireless communication at a first user equipment (UE), comprising:
receiving a common message associated with the first UE and at least one second UE; and
obtaining a common message configuration comprising at least one of a first indicator for a first data portion of the common message associated with the first UE or at least one second indicator for at least one second data portion of the common message associated with the at least one second UE, wherein the common message configuration is obtained from at least one of a header of the common message or downlink control information (DCI) scheduling the common message;
receiving a private message associated with the first UE; and
combining the private message with the first data portion of the common message or forgo combining the private message with the first data portion of the common message based on the common message configuration, wherein to combine the private message with the first data portion of the common message, the at least one processor is configured to:
decode the private message to derive a decoded private message;
decode the common message to derive a decoded common message,
identify a first data portion of the decoded common message to derive a first decoded portion of the common message; and
combine the decoded private message with the first decoded portion of the common message to derive a decoded message for the first UE;
wherein to decode the common message, the at least one processor is configured to:
decode the common message at a first layer to derive the decoded common message;
identify the first data portion of the decoded common message to derive the first decoded portion of the common message based on the common message configuration at the first layer; and
output the first decoded portion to a second layer.

23. A method of wireless communication at a network entity, comprising:
configuring a common message configuration comprising at least one of a first indicator for a first data portion of a common message associated with a first UE or at least one second indicator for at least one second data portion of the common message associated with at least one second UE;
transmitting at least one of (a) the common message comprising the common message configuration or (b) the common message and the common message configuration to the first UE and the at least one second UE;
wherein the common message configuration is included in a header of the common message; and
wherein the header comprises a fourth set of sub-headers that are non-contiguous in the common message, wherein the fourth set of sub-headers comprises a first sub-header comprising a first UE ID for the first UE preceding the first data portion and at least one second sub-header comprising at least one second UE ID for the at least one second UE preceding the at least one second data portion.

\* \* \* \* \*